(12) United States Patent
Tanaka et al.

(10) Patent No.: US 8,503,389 B2
(45) Date of Patent: Aug. 6, 2013

(54) TRANSMITTING APPARATUS, RECEIVING APPARATUS, AND COMMUNICATION METHOD

(75) Inventors: Yoshinori Tanaka, Kawasaki (JP); Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 110 days.

(21) Appl. No.: 12/691,495

(22) Filed: Jan. 21, 2010

(65) Prior Publication Data

US 2010/0118730 A1 May 13, 2010

Related U.S. Application Data

(63) Continuation of application No. PCT/JP2007/065754, filed on Aug. 10, 2007.

(51) Int. Cl.
*H04W 24/00* (2009.01)
(52) U.S. Cl.
USPC .......................................... 370/330; 370/343
(58) Field of Classification Search
USPC ................................................. 370/330, 343
See application file for complete search history.

(56) References Cited

U.S. PATENT DOCUMENTS

| | | | |
|---|---|---|---|
| 2010/0135273 A1* | 6/2010 | Kim .............................. | 370/344 |
| 2010/0273494 A1* | 10/2010 | Iwai et al. .................... | 455/450 |
| 2010/0296480 A1* | 11/2010 | Nouda et al. ................. | 370/330 |
| 2011/0032888 A1* | 2/2011 | Matsumoto et al. ......... | 370/329 |
| 2011/0116436 A1* | 5/2011 | Bachu et al. ................. | 370/312 |

FOREIGN PATENT DOCUMENTS

| | | | |
|---|---|---|---|
| EP | 2187545 A1 | * | 5/2010 |
| JP | 2007124578 | | 5/2007 |
| WO | 2007052811 | | 5/2007 |
| WO | WO 2009/022391 A1 | * | 2/2009 |

OTHER PUBLICATIONS

Panasonic, 'Sounding RS position and relation with PUCCH', TSG RAN WG1 Meeting #51, Nov. 5-9, 2007, pp. 1-4.*
Freescale Semiconductor, 'On the Need for Sounding RS Hopping', May 7-11, 2007, 3GPP TSG-RAN1 #49, R1-072528, pp. 1-3.*
International Search Report dated Nov. 13, 2007 based on International Application No. PCT/JP2007/065754.
3GPP TR 25.814 V7.1.0 (Sep. 2006) 3rd Generation Partnership Project; Technical Specification Group Radio Access Network; Physical layer aspects for evolved Universal Terrestrial Radio Access (UTRA) (Release 7), pp. 1-132.
3GPP TS 36.300 V8.1.0 (Jun. 2007) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), pp. 1-106.

(Continued)

*Primary Examiner* — Melvin Marcelo
(74) *Attorney, Agent, or Firm* — Smith, Gambrell & Russell, LLP

(57) ABSTRACT

A transmitting apparatus is capable of transmitting data at a first frequency and second frequency to a receiving apparatus. A transmitter of the transmitting apparatus transmits a predetermined wideband signal, in a first time period in a frequency band which does not include the first frequency and in a second time period in a frequency band which does not include the second frequency. A quality measuring unit of the receiving apparatus measures the quality of communication with the transmitting apparatus based on the wideband signal received in the first and second time periods.

19 Claims, 21 Drawing Sheets

(56) References Cited

OTHER PUBLICATIONS

3GPP TS 36.211 V1.1.0 (May 2007) 3rd Generation Partnership Project; Technical Specification Group Radio Access Network; Physical Channels and Modulation (Release 8), pp. 1-34.

3GPP TSG RAN1 #49-bis R1-072756 Jun. 25-29, 2007 Orlando, USA, pp. 1-6.

Yoshiaki Ofuji, Kenichi Higuch, and Mamoru Sawahashi, "Frequency Domain Channel-Dependent Scheduling Employing an Adaptive Transmission Bandwidth for Pilot Channel in Uplink Single-Carrier-FDMA Radio Access", Vehicular Technology Conference, 2006. VTC 2006-Spring. IEEE 63rd, pp. 334-338.

Yoshiaki Ofuji, Ken'ichi Higuchi, Mamoru Sanahashi, "Nobori Link Single Career FDMA ni Okeru CQI Sokuteiyo Pilot Channel no Soshin Taiikihaba no Group-ka o Mochiiru Shuhasu Ryoiki Scheduling-ho", 2006 Nen IEICE Communications Society Conference Koen Ronbunshu 1, The Institute of Electronics, Information and Communication Engineers, Sep. 7, 2006, p. 395 (Partial Translation is attached).

Japanese Office Action dated Nov. 22, 2011 issued in application No. 2009-527981.

LG Electronics Inc., Investigation on problems in case of PUCCH and S-RS simultaneous transmission, 3GPP TSG RAN WG1 #49bis R1-072887, Orlando, FL, USA, Jun. 25-29, 2007.

Qualcomm Europe, sounding Reference Signals, GPP TSG RAN1 #49bis R1-073073, p. 1-8, Orlando, USA, Jun. 25-29, 2007.

NTT DoCoMo, et al., Assignment Scheme for Sounding Reference Signals in E-UTRA Uplink, 3GPP TSG RAN WG1 Meeting #49bis R1-072939, p. 1-4, Orlando, USA, Jun. 25-29, 2007 (Original R1-070091).

Office Action issued Jul. 19, 2012 from the corresponding Australian Patent Application No. 2012201359.

"On the Need for Sounding RS Hopping" May 7-11, 2007 3GPP TSG-RAN1 #49, R1-072528, pp. 1-3.

\* cited by examiner

TRANSMITTING APPARATUS, RECEIVING APPARATUS, AND COMMUNICATION METHOD

This application is a continuing application, filed under 35 U.S.C. §111(a), of International Application PCT/JP2007/065754, filed Aug. 10, 2007.

FIELD

The embodiments discussed herein are related to a transmitting apparatus, receiving apparatus, and communication method.

BACKGROUND

At present, in the field of mobile communication systems, communication systems in operation employ CDMA (Code Division Multiple Access) as a multiple access scheme. On the other hand, a study on next generation mobile communication systems has been very active, aiming for much faster wireless communications. The 3GPP (3rd Generation Partnership Project) which develops standards for third generation mobile communication systems, for example, is working on standardization of new specifications for mobile communication systems, called LTE (Long Term Evolution) (for example, refer to 3rd Generation Partnership Project, "Evolved Universal Terrestrial Radio Access (E-UTRA) and Evolved Universal Terrestrial Radio Access (E-UTRAN); Overall description; Stage 2 (Release 8)", 3GPP TS36.300, 2007-06, V8.1.0.).

The next generation mobile communication systems are supposed to employ OFDMA (Orthogonal Frequency Division Multiple Access) or SC-FDMA (Single Carrier-Frequency Division Multiple Access) as a multiple access scheme. Such mobile communication systems schedule uplink data transmission from a mobile station to a base station as follows.

When the mobile station has control information and other data to transmit, the base station performs dynamic allocation of radio resources in both the frequency domain and the time domain for an uplink data channel. Then, the base station provides the mobile station with the result of the radio resource allocation. According to the result, the mobile station transmits both the control information and the other data at the allocated frequency and in the allocated time slots.

When the mobile station has only control information to transmit, on the other hand, the mobile station is not allocated any resource for the uplink data channel, and transmits the control information to the base station on an uplink control channel which is a radio resource previously set for transmission of control information. The control information which is transmitted on the uplink includes ACK (ACKnowledgement)/NACK (Negative ACKnowledgement) which is a response to data from the base station, and CQI (Channel Quality Indicator) which is a measure of the quality of downlink communication (for example, refer to 3rd Generation Partnership Project, "Physical Channels and Modulation (Release 8)", 3GPP TS36.211, 2007-05, V1.1.0.).

By the way, the base station preferentially allocates a frequency band with the best uplink communication quality for the uplink data channel, from the available frequency band between the base station and the mobile station. Therefore, before being allocated a resource for the uplink data channel, the mobile station needs to transmit to the base station a wideband pilot signal (SRS: Sounding Reference Signal) that is used for measuring the quality of uplink communication. In this case, there arises a problem of how to multiplex control information and SRS when a same or different mobile stations transmit them simultaneously. To tackle this problem, the following multiplexing scheme has been proposed (for example, refer to 3rd Generation Partnership Project, "Multiplexing of Sounding RS and PUCCH", 3GPP TSG-RAN WG1 #49bis R1-072756, 2007-6).

FIG. 21 illustrates an example of uplink signals including SRS. In this example of FIG. 21, ACK is transmitted as control information with two frequency bands as uplink control channels i and j. The mobile station is permitted to use one of these uplink control channels i and j to transmit the control information. On each uplink control channel, a signal indicating control information and a pilot signal (RS (Reference Signal)) are scheduled in a predetermined order. However, in a predetermined portion of a unit time period, all frequency bands are reserved as a radio resource for SRS transmission. When transmitting SRS, the mobile station uses the reserved resource in the predetermined portion of the unit time period.

However, the time multiplexing scheme employed in the above "Multiplexing of Sounding RS and PUICCH, 3GPP TSG-RAN WG1 #49bis R1-072756, 2007-6" (3rd Generation Partnership Project) does not permit control information to be transmitted at the same time as a wideband signal to be used for measuring communication quality. Therefore, as compared with the case of not multiplexing a wideband signal and a control information signal, this scheme provides less radio resources available in every unit time period on every uplink channel. This causes problems that the quality of receiving a signal indicating control information deteriorates at a receiving apparatus (corresponding to the above-described base station on the uplink) and that the number of transmitting apparatuses (corresponding to the above-described mobile station on the uplink) which can be covered by each control channel decreases.

SUMMARY

According to an aspect of the invention, a transmitting apparatus which is capable of performing both data transmission at a first frequency and the data transmission at a second frequency includes: a transmitter which transmits a signal to be used by a receiving apparatus for measuring communication quality, in a first frequency band in a given portion of a first time period, and transmits the signal in a second frequency band in a given portion of a second time period coming after the first time period, the first frequency band having a wider bandwidth than a frequency band used for the data transmission and not including the first frequency, the second frequency band having a wider bandwidth than the frequency band used for the data transmission and not including the second frequency.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF DRAWING(S)

DESCRIPTION OF EMBODIMENT(S)

Preferred embodiments of the present invention will be described in detail with reference to the accompanying drawings. The description begins with an overview of an embodiment to be discussed herein and then proceeds to the details of those embodiments.

Figure 1:
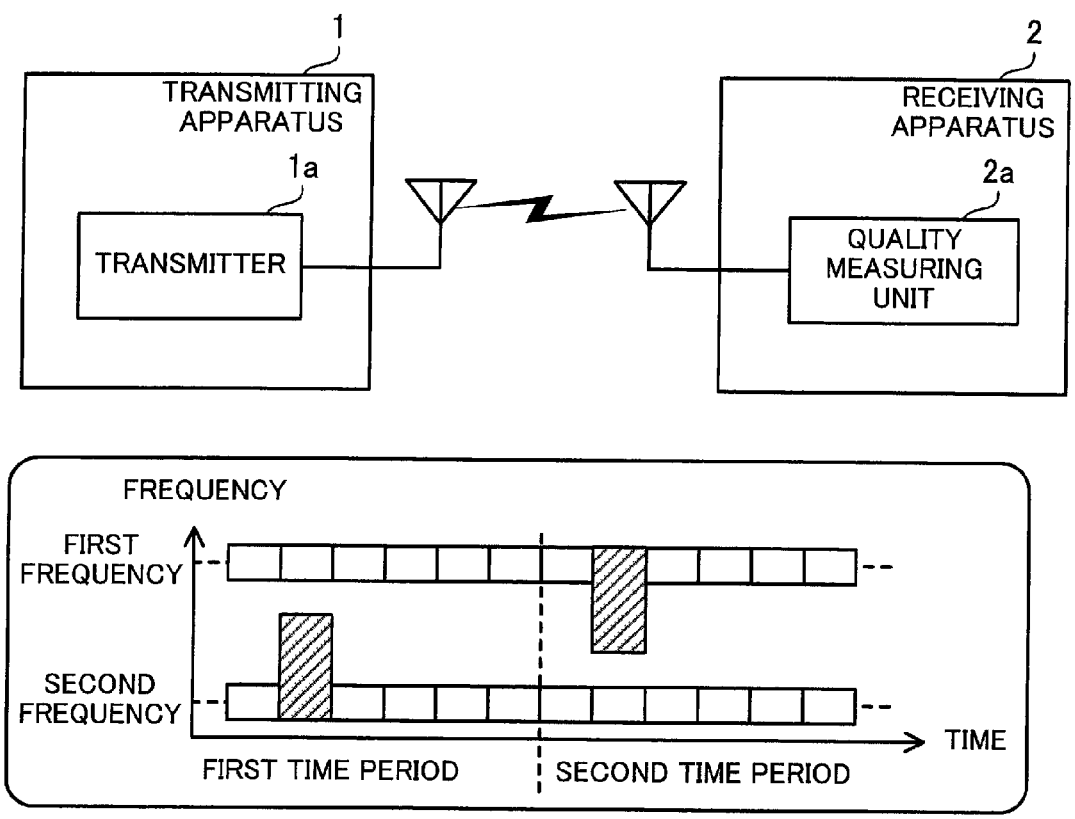
FIG. 1 illustrates an overview of an embodiment.

FIG. 1 illustrates an overview of an embodiment. The communication system in FIG. 1 is for data transmission and reception at a plurality of frequencies, and includes a transmitting apparatus 1 and a receiving apparatus 2.

The transmitting apparatus 1 is a communication apparatus that transmits data by radio to the receiving apparatus 2. The transmitting apparatus 1, for example, is equivalent to a mobile station of a mobile telephone system. The transmitting apparatus 1 includes a transmitter 1*a* which transmits to the receiving apparatus 2 a signal to be used for measuring the quality of radio communication from the transmitting apparatus 1 to the receiving apparatus 2.

In more detail, the transmitter 1*a* transmits a wideband signal which occupies a wider frequency band than is used for data transmission, in a given portion of a first time period in a frequency band which does not include a first frequency. Then, the transmitter 1*a* transmits the wideband signal in a given portion of a second time period coming after the first time period in a frequency band which does not include a second frequency.

The receiving apparatus 2 is a communication apparatus that receives data by radio from the transmitting apparatus 1. The receiving apparatus 2, for example, is equivalent to a base station of a mobile telephone system. The receiving apparatus 2 includes a quality measuring unit 2*a*. The quality measuring unit 2*a* measures the quality of radio communication from the transmitting apparatus 1 to the receiving apparatus 2, based on the wideband signal received from the transmitting apparatus 1 in the first and second time periods. The measured quality of radio communication may be used as an index for selecting a frequency band to be allocated to the transmitting apparatus 1, for example.

In such the communication system, the transmitter 1*a* of the transmitting apparatus 1 uses a frequency band which does not include the first frequency in a given portion of the first time period and uses a frequency band which does not include the second frequency in a given portion of the second time period in order to transmit a wideband signal. Then, the quality measuring unit 2*a* of the receiving apparatus 2 measures the quality of radio communication from the transmitting apparatus 1 to the receiving apparatus 2 based on the wideband signal received in the first and second time periods.

In general, the measurement of communication quality needs a signal over a wide range of frequencies. However, if a transmitted signal occupies all of the frequency bands available for communication between the transmitting apparatus 1 and the receiving apparatus 2, data transmission and reception is inhibited during this transmission. The above technique enables the use of at least the first frequency without interference of the wideband signal during the first time period and the use of at least the second frequency without interference of the wideband signal during the second time period.

Therefore, this technique makes it possible to prevent deterioration in communication quality due to a reduction in time period available for data transmission and reception. Further, the receiving apparatus 2 can use the wideband signal received in the first and second time periods, which makes it possible to measure the quality of a wide range of frequencies.

First Embodiment

Hereinafter, the first embodiment will be described in detail with reference to the accompanying drawings.

Figure 2:
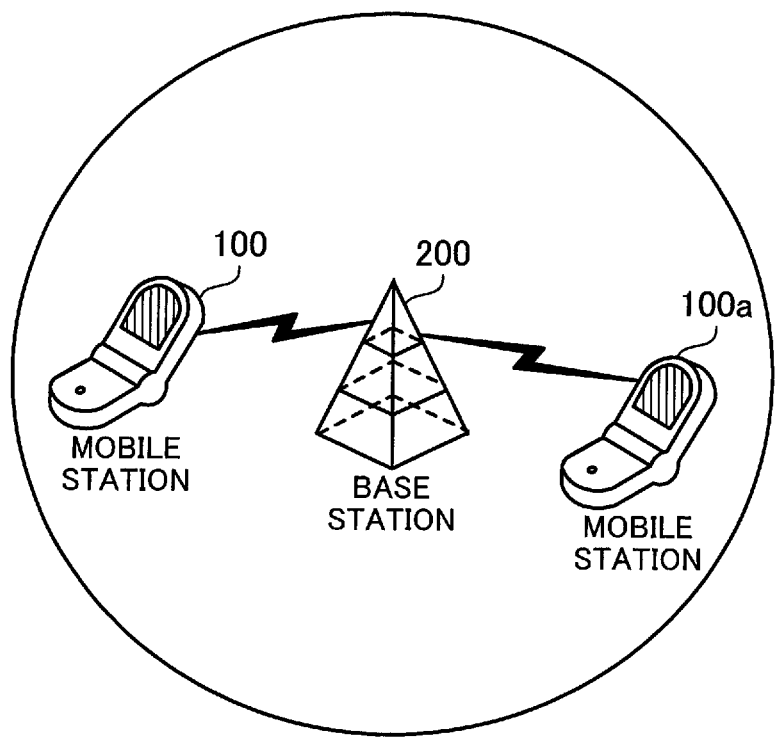
FIG. 2 illustrates a system configuration of the embodiment.

FIG. 2 illustrates a system configuration according to the embodiment. A mobile communication system according to the embodiment is a radio communication system where packet data is transmitted. The mobile communication system in FIG. 2 includes mobile stations 100 and 100*a* and a base station 200.

The mobile stations 100 and 100*a* are mobile telephones, for example. While in the communication range (cell) of the base station, the mobile stations 100 and 100*a* are capable of performing radio communication with the base station, and transmitting and receiving packet data with an unillustrated computer or another mobile station via the base station. The packet data which the mobile stations 100 and 100*a* transmit and receive includes VoIP (Voice over Internet Protocol) data, electronic mail data, and image data.

The base station 200 constantly monitors mobile stations existing in its cell, and performs wire or radio communication with other base stations where appropriate. Upon receipt of a radio communication request from a mobile station existing in the cell or a radio communication request for communication with a mobile station existing in the cell, the base station 200 transmits and receives various control information and packet data with the mobile station.

Figure 3:
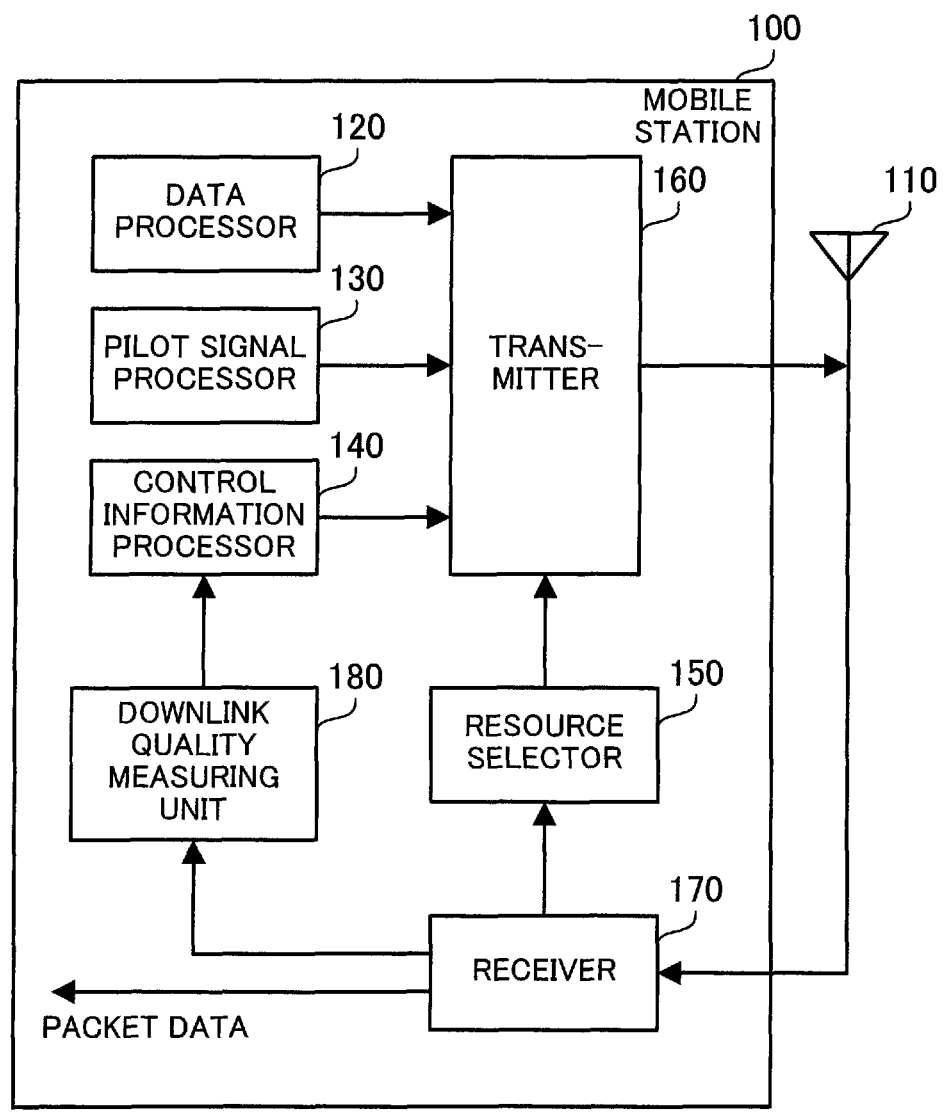
FIG. 3 is a block diagram illustrating functions of a mobile station according to a first embodiment.

FIG. 3 is a block diagram illustrating functions of a mobile station according to the first embodiment. The mobile station 100 includes a transmitting and receiving antenna 110, a data processor 120, a pilot signal processor 130, a control information processor 140, a resource selector 150, a transmitter 160, a receiver 170, and a downlink quality measuring unit 180.

The transmitting and receiving antenna 110 is an antenna to be used for transmission and reception, and is designed to transmit by radio uplink signals output from the transmitter 160 to the base station 200, and to receive downlink signals transmitted by radio from the base station 200 and pass the signals to the receiver 170.

The data processor 120 generates packet data to be transmitted by radio, and encodes and outputs the data. For example, the data processor 120 generates VoIP data, electronic mail data, image data, etc. in response to operational inputs from the user of the mobile station 100.

The pilot signal processor 130 generates various types of pilot signals. An encoding pattern is defined for each type of pilot signals. Pilot signals that the pilot signal processor 130 generates include SRS to be used for measurement of uplink communication quality.

The control information processor 140 generates control information to be transmitted by radio, and encodes and outputs the information according to prescribed rules. The control information that the control information processor 140 generates includes ACK/NACK which is a response to packet data from a base station, CQI which is a measure of downlink communication quality, an uplink radio resource allocation request, etc. More specifically, when supplied with a measure of downlink communication quality from the downlink quality measuring unit 180, the control information processor 140 generates CQI.

The resource selector 150 manages uplink radio resources available to the mobile station 100. The resource selector 150 occasionally receives, from the receiver 170, control information (UL allocation grant information) indicating an uplink radio resource allocated by the base station 200. In addition, the resource selector 150 provides the transmitter 160 with information about the allocation of radio resources.

The transmitter 160 identifies radio resources to be used for transmission of packet data, pilot signal, and control information based on the allocation information provided by the resource selector 150. Then the transmitter 160 modulates and multiplexes the packet data signal, pilot signal, and control information signal, and outputs the resultant to the transmitting and receiving antenna 110. This embodiment employs SC-FDMA or OFDMA as a multiplexing scheme.

Upon receipt of received signals via the transmitting and receiving antenna 110, the receiver 170 checks the signals to determine whether they contains a signal addressed to the own station. If such a signal is detected, the receiver 170 demodulates and decodes the signal. Packet data included in the received signal, if there is, is taken inside. The mobile station 100 processes the packet data according to its type. For example, in the case of VoIP data, the mobile station 100 outputs sounds from a speaker. In the case of electronic mail or image data, the mobile station 100 displays text or images on a display screen.

UL allocation grant information included in the received signal, if there is, the receiver 170 passes the information to the resource selector 150. The receiver 170 also extracts a signal to be used for measuring downlink communication quality from the received signal, and passes the signal to the downlink quality measuring unit 180.

The downlink quality measuring unit 180 measures the communication quality of a plurality of downlink frequency bands based on the signal supplied from the receiver 170. Then the downlink quality measuring unit 180 supplies the measurement result to the control information processor 140.

Note that the mobile station 100a may be designed to have the same module configuration as the mobile station 100.

Figure 4:
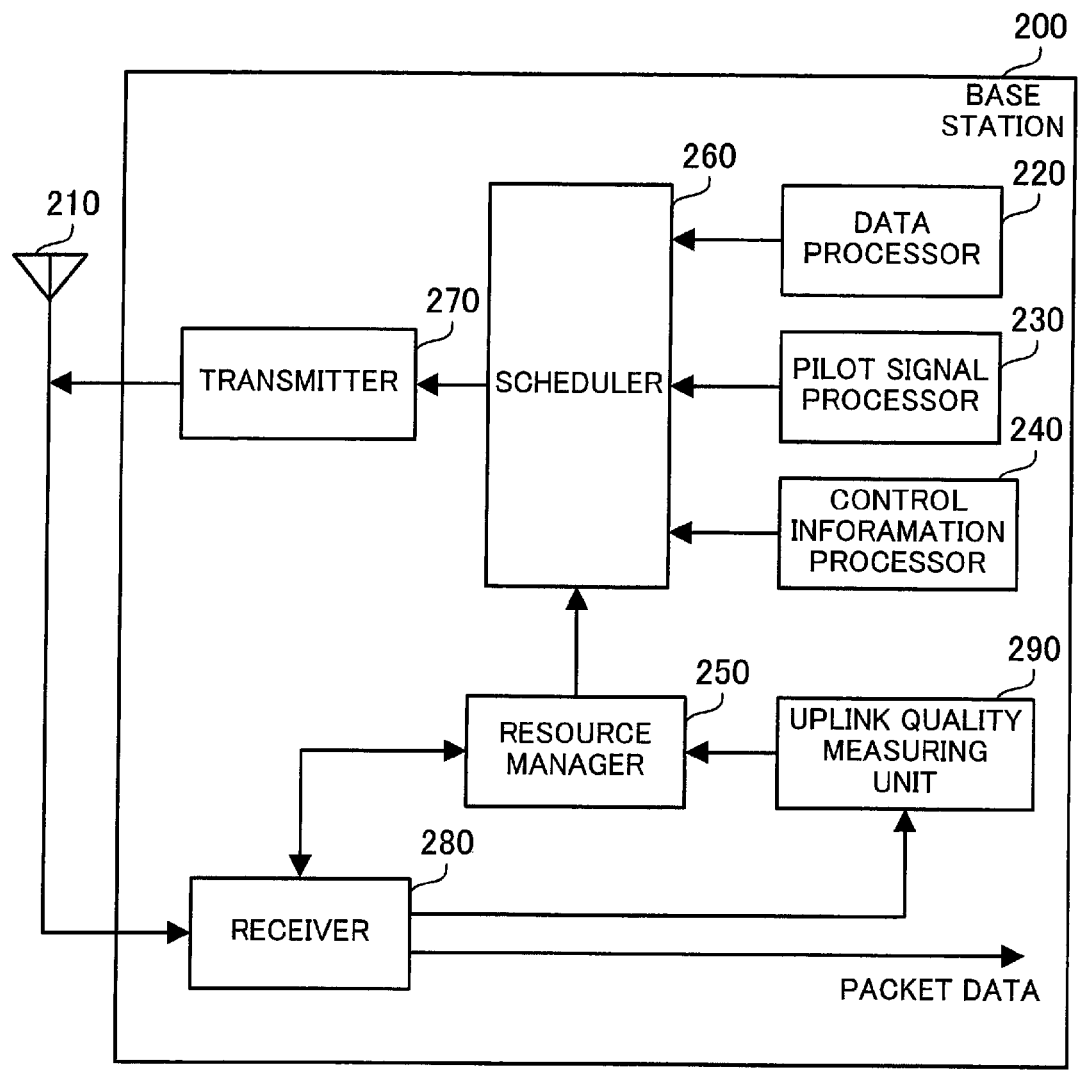
FIG. 4 is a block diagram illustrating functions of a base station.

FIG. 4 is a block diagram illustrating functions of a base station. The base station 200 includes a transmitting and receiving antenna 210, a data processor 220, a pilot signal processor 230, a control information processor 240, a resource manager 250, a scheduler 260, a transmitter 270, a receiver 280, and an uplink quality measuring unit 290.

The transmitting and receiving antenna 210 is an antenna for transmission and reception. The transmitting and receiving antenna 210 transmits, by radio, downlink signals output from the transmitter 270. The transmitting and receiving antenna 210 also receives uplink signals transmitted by radio from the mobile stations 100 and 100a, and passes them to the receiver 280.

If there is packet data to be transmitted by radio to a mobile station 100, 100a existing in the cell, the data processor 220 encodes and outputs the data. For example, when supplied with VoIP data, electronic mail data, image data, or another data which is addressed to a mobile station 100, 100a, the data processor 220 encodes and outputs the data.

The pilot signal processor 230 generates various types of pilot signals which enable the mobile station 100, 100a to reproduce correctly packet data from radio signals. An encoding pattern is defined for each type of pilot signals.

The control information processor 240 generates control information to be transmitted by radio, and encodes and outputs the information according to predetermined rules. The control information which the control information processor 240 generates includes information for demodulation and decoding, such as the encoding scheme of packet data and a radio resource used for transmission of the packet data, and UL allocation grant information indicating allocation of an uplink radio resource.

The resource manager 250 manages downlink and uplink radio resources between the base station 200 and the mobile stations 100 and 100a existing in the cell. The resource manager 250 provides the scheduler 260 and the receiver 280 with information about the current state of allocation of radio resources. In allocating an uplink radio resource to a mobile station 100, 100a, the resource manager 250 refers to the measurement results of communication quality supplied from the uplink quality measuring unit 290. The resource manager 250 preferentially allocates a frequency band with good communication quality.

The scheduler 260 determines radio resources to be used for transmission of packet data, pilot signal, and control information which are addressed to each mobile station, based on the information about the current state of allocation of downlink radio resources supplied from the resource manager 250. This embodiment employs OFDMA as a multiplexing scheme.

In accordance with instructions from the scheduler 260, the transmitter 270 modulates and multiplexes the packet data signal, pilot signal, and control information signal, and outputs the resultant to the transmitting and receiving antenna 210.

When supplied with received signals from the transmitting and receiving antenna 210, the receiver 280 demodulates and decodes a signal transmitted from each of the mobile stations 100 and 100a existing in the cell, with reference to the information of the uplink radio resource allocation supplied from the resource manager 250. Packet data included in the received signal, if there is, is taken inside. The base station 200 transfers the taken packet data to its destination computer or mobile station.

If the received signal includes control information requesting allocation of a radio resource, then the receiver 280 passes the information to the resource manager 250. If the received signal includes SRS, then the receiver 280 passes the SRS to the uplink quality measuring unit 290.

When supplied with the SRS from the receiver 280, the uplink quality measuring unit 290 measures the communication quality of a plurality of uplink frequency bands based on the SRS. The uplink quality measuring unit 290 then supplies the measurement result to the resource manager 250.

Figure 5:
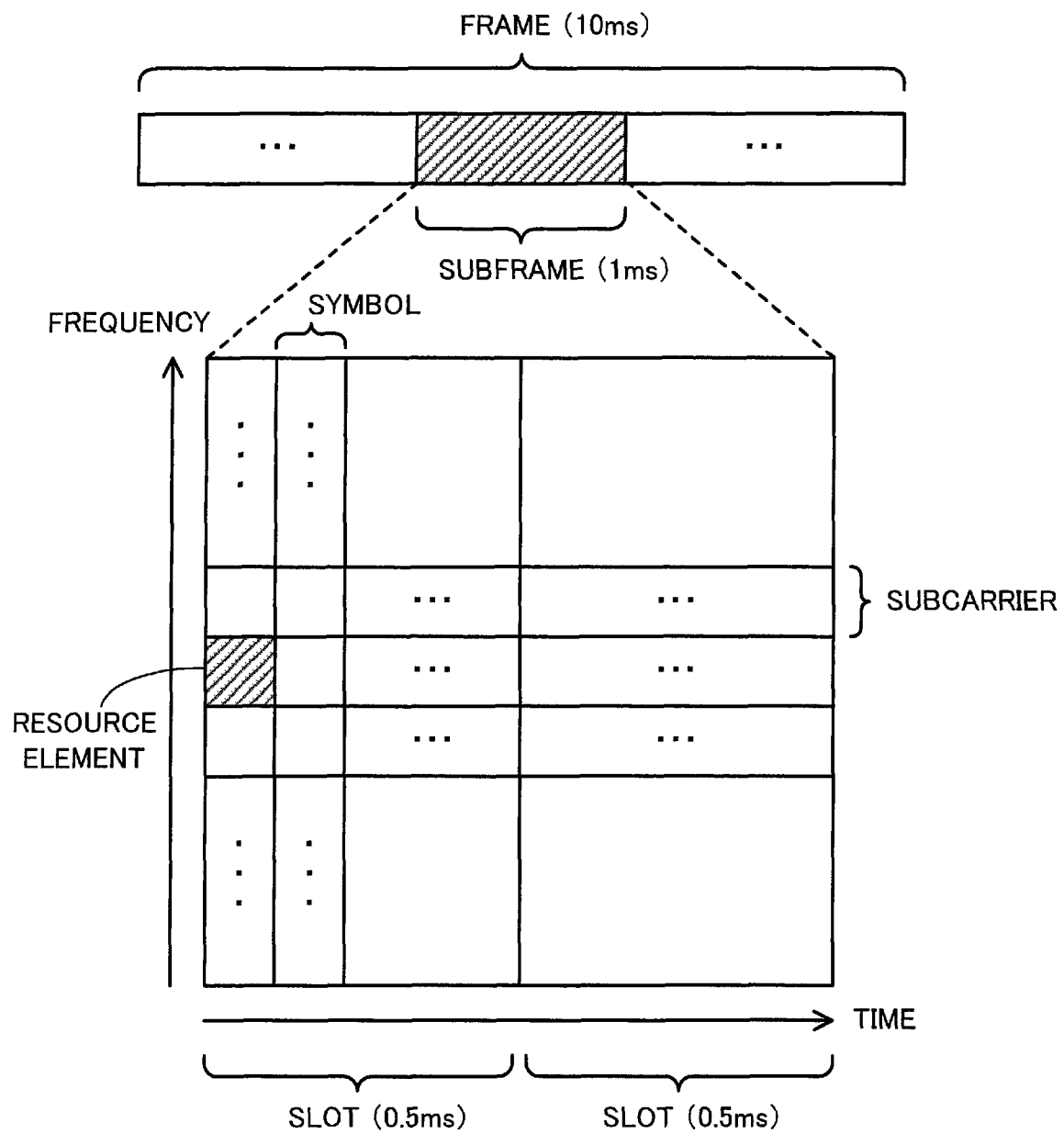
FIG. 5 illustrates a frame structure.

FIG. 5 illustrates a frame structure. FIG. 5 schematically depicts the structure of a frame which is transmitted and received between the mobile stations 100 and 100a and the base station 200. Each frame has a time length of 10 ms, and has a plurality of subframes with a time length of 1 ms.

Each subframe is further divided in both the frequency domain and the time domain for radio resource allocation management. A minimum unit for allocation in a frequency axis is called a subcarrier, and a minimum unit for allocation in a time axis is called a symbol. A smallest unit of radio resource allocation, represented by one subcarrier and one symbol, is called a resource element. In this connection, the first and second halves of the 1-ms subframe, each of which therefore has 0.5 ms, are called slots, respectively. That is to say, one subframe has two slots.

Such radio resources are used for uplink and downlink control channels and uplink and downlink data channels. When a signal is transmitted, a guard interval called CP (Cyclic Prefix) is inserted at the beginning of each symbol so as to prevent interference between signals due to propagation delay. Here, two types of CPs (Short CP and Long CP) having different time lengths are employed.

Figure 6:
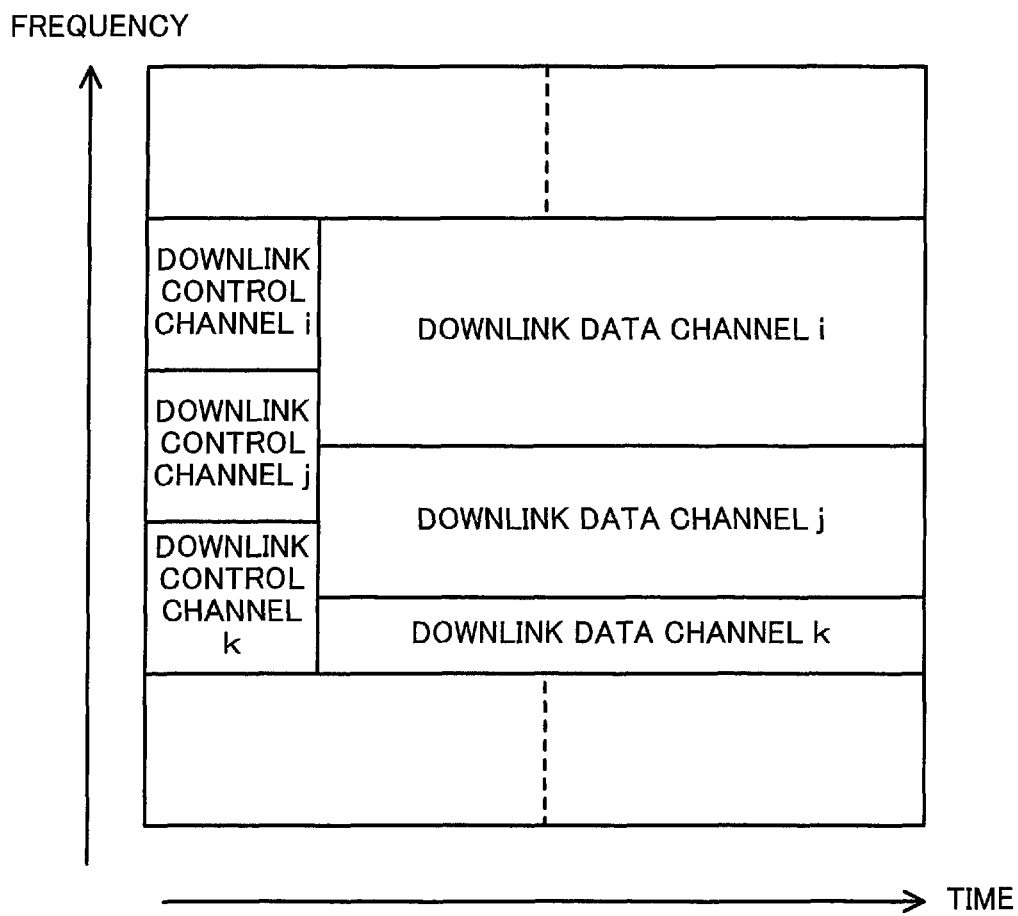
FIG. 6 illustrates allocation of downlink channels.

FIG. 6 illustrates allocation of downlink channels. FIG. 6 schematically depicts the structure of a subframe which is transmitted on the downlink from the base station 200 to the mobile stations 100 and 100a. For the downlink, radio resources are allocated to downlink control channels and downlink data channels to the mobile stations.

Each downlink control channel is allocated a radio resource having a predetermined symbol length from the beginning of a subframe. In general, one to three symbols from the beginning of the subframe are allocated. The frequencies of the downlink control channels to a plurality of mobile stations are multiplexed. The mobile station 100, 100a detects a downlink control channel for the own station out of the plurality of downlink control channels whose frequencies are multiplexed. The downlink control channel is used for transmitting information indicating an encoding scheme of data included in a downlink data channel and a radio resource used for the downlink data channel, and UL allocation grant information.

Each downlink data channel is allocated a radio resource other than radio resources used for the downlink control channels. The frequencies of downlink data channels to a plurality of mobile stations are multiplexed. The downlink data channels and downlink control channels are time-multiplexed. The mobile station 100, 100a refers to the control information transmitted on the downlink control channel to identify the radio resource of the downlink data channel for the own station. An amount of radio resource to be used for a downlink data channel is variable. The downlink data channel is used for transmission of packet data.

The above downlink control channel may be represented as PDCCH (Physical Downlink Control Channel) while the above downlink data channel may be represented as PDSCH (Physical Downlink Shared Channel).

Figure 7:
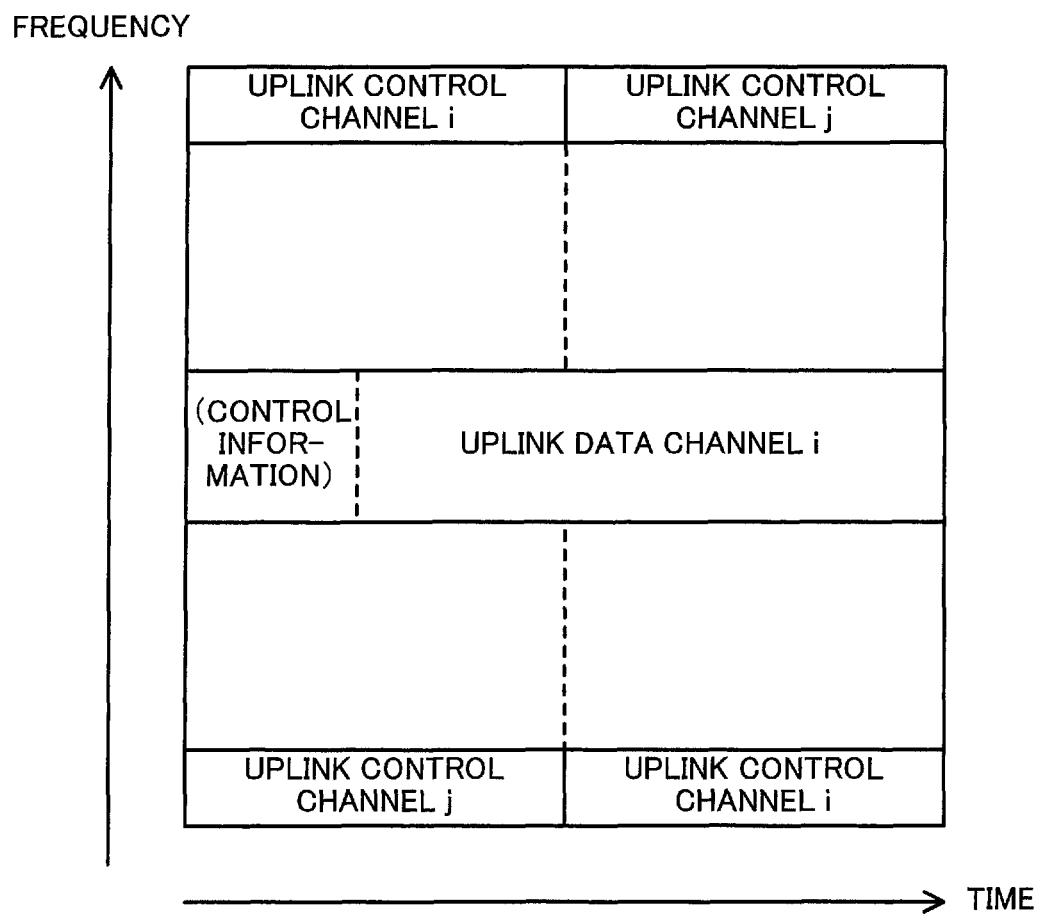
FIG. 7 illustrates allocation of uplink channels.

FIG. 7 illustrates allocation of uplink channels. FIG. 7 schematically depicts the structure of a subframe which is transmitted on the uplink from the mobile stations 100 and 100a to the base station 200. For the uplink, radio resources are allocated to uplink control channels each of which is shared by a plurality of mobile stations and uplink data channels each of which is used by one mobile station.

Each uplink control channel is allocated a radio resource of a predetermined frequency band including one of two limiting frequencies, or the frequency bands located at both edges of the transmission band, of the entire frequency band available between the mobile stations 100 and 100a and the base station 200.

Here, two uplink control channels are provided for the uplink. One uplink control channel uses a high-frequency radio resource in the first half slot and a low-frequency radio resource in the second half slot (represented as uplink control channel i in FIG. 7). The other uplink control channel uses a low-frequency radio resource in the first half slot and a high-frequency radio resource in the second half slot (represented as uplink control channel j in FIG. 7).

One of the two uplink control channels is allocated to each mobile station 100, 100a by the base station 200. The base station 200 indirectly manages this allocation to the mobile stations 100 and 100a through the allocation of downlink control channels for the downlink. More specifically, uplink control channels are allocated according to the allocation of downlink control channels in such a way that a mobile station allocated the downlink control channel i in FIG. 6 uses the uplink control channel i, a mobile station allocated the downlink control channel j uses the uplink control channel j, and a mobile station allocated the downlink control channel k uses the uplink control channel i.

The uplink control channel is used for transmitting ACK/NACK, CQI, and requests for allocation of radio resources, etc. On each uplink control channel, control information from a plurality of mobile stations is encoded, multiplexed, and then transmitted. Normally, one uplink control channel allows transmission of control information from six mobile stations. If the base station 200 has many mobile stations, the base station 200 secures a wider frequency band for the uplink control channels, thereby enabling many mobile stations to transmit control information on the uplink control channels.

Each uplink data channel is allocated a frequency band other than frequency bands used for the uplink control channels. The frequencies of uplink data channels from a plurality of mobile stations are multiplexed. A mobile station 100, 100a identifies a usable radio resource for an uplink data channel based on UL allocation grant information received on a downlink control channel. The uplink data channel is used for transmission of packet data. In addition, the uplink data channel may be used for transmission of control information as well.

The mobile station 100, 100a determines which one of an uplink control channel and an uplink data channel is appropriate to use for transmission of control information, based on whether or not having being assigned an uplink data channel by the base station 200. More specifically, if an uplink data channel has been assigned, the mobile station 100, 100a uses the uplink data channel to transmit the control information together with packet data. If no uplink data channel has been assigned, on the contrary, the mobile station 100, 100a uses an uplink control channel to transmit the control information.

By the way, on the uplink, SRS, which is a wideband signal, may be transmitted, other than signals on the uplink control channels and uplink data channels. SRS is transmitted from the mobile station 100, 100a in response to an instruction from the base station 200. The following describes how to multiplex SRS and other signals on the uplink.

Figure 8:
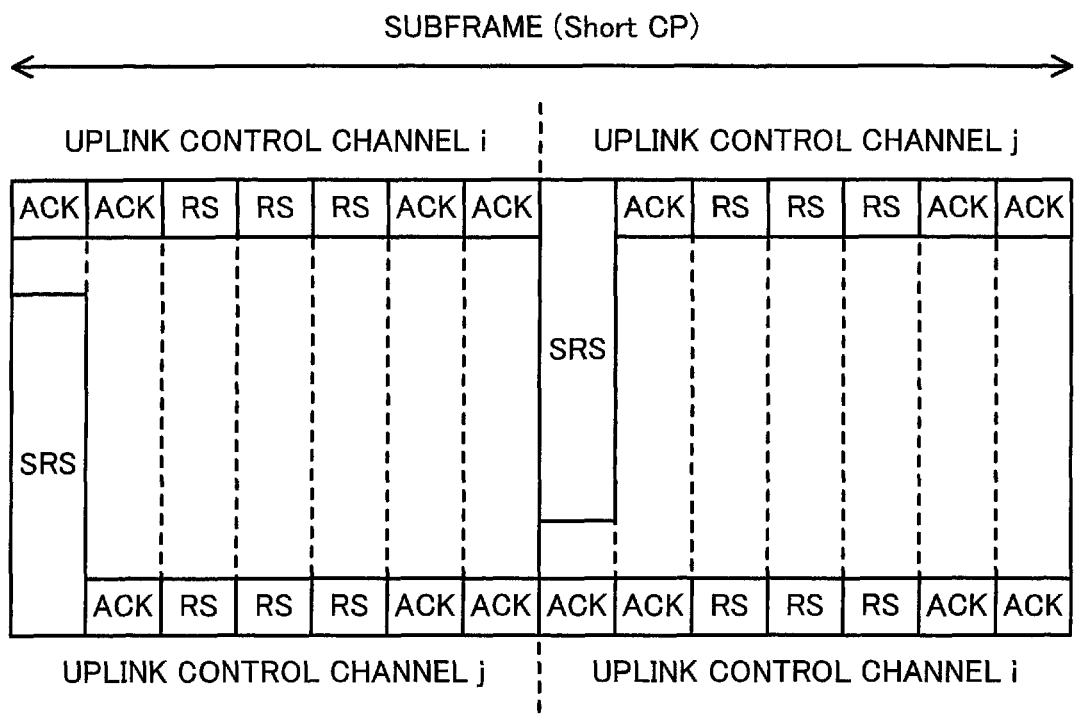
FIG. 8 illustrates an example of uplink signals including ACK according to the first embodiment.

FIG. 8 illustrates an example of uplink signals including ACK according to the first embodiment. FIG. 8 describes how to allocate radio resources in the case where a signal indicting ACK and SRS are multiplexed in a subframe with Short CP. The subframe with Short CP includes 14 symbols. The first half seven symbols constitute a slot, and so do the second half seven symbols.

In each of the first and second half slots of an uplink control channel i, four out of the seven symbols are allocated for ACK while the other three are allocated for RS (pilot signal). More specifically, the symbols are allocated for ACK, ACK, RS, RS, RS, ACK, and ACK, in order from the first symbol. Note that one bit is sufficient for an ACK/NACK signal, and so the same signal is transmitted in the symbols allocated for ACK.

Similarly to the uplink control channel i, in each of the first and second half slots of an uplink control channel j, four out of the seven symbols are allocated for ACK while the other three are allocated for RS. However, when one or more mobile stations transmit SRS, the first symbol of each slot is used for the SRS transmission and is not used for the ACK transmission.

A wideband radio resource which is allocated for SRS does not include the frequency band of the uplink control channel i but does include the frequency band of the uplink control channel j. In this connection, it is preferable that the frequency band of the uplink control channel i and that for the SRS transmission are not consecutive. This is because an increase in the number of mobile stations belonging to the base station 200 may increase the necessity of providing a wider frequency band for the uplink control channel i.

In the radio resource allocated for SRS, SRSs from a plurality of mobile stations can be encoded, multiplexed, and then transmitted. That is, the mobile stations 100 and 100*a* can transmit their SRSs simultaneously. Note that the mobile station 100, 100*a* does not output a signal over all frequencies of the radio resource allocated for SRS, but selects parts of the frequencies and outputs the signal. This is because based on the communication quality of selected frequency parts, the communication quality of other frequencies can be estimated.

Consider the case where the mobile stations 100 and 100*a* exist in the same cell, and one mobile station 100 transmits SRS and the other mobile station 100*a* does not. In this case, the base station 200 allocates the mobile station 100, which is supposed to transmit SRS, a radio resource to be used for SRS transmission and the uplink control channel j as an uplink control channel. According to this allocation, the mobile station 100 transmits the SRS in the first symbol of each slot.

In order to transmit ACK besides SRS in the same subframe, the mobile station 100 uses the uplink control channel j in symbols other than the first symbol of each slot. However, if the mobile station 100 has an uplink data channel assigned by the base station 200, the mobile station 100 transmits the ACK on the uplink data channel, not on the uplink control channel j. In this case, the mobile station 100 avoids using the first symbol in each slot as well.

On the other hand, the base station 200 allocates the uplink control channel i as an uplink control channel to the mobile station 100*a*, which is not supposed to transmit SRS. The mobile station 100*a* uses the uplink control channel i to transmit ACK. At this time, the mobile station 100*a* can use all of the slots in the subframe. However, if the mobile station 100*a* has an uplink data channel assigned by the base station 200, the mobile station 100*a* transmits the ACK on the uplink data channel, not on the uplink control channel i. In this case, the mobile station 100 avoids using the first symbol in each slot.

The base station 200 gives the mobile station 100*a* an advance notice that the mobile station 100 is supposed to transmit SRS.

If no mobile station transmits SRS in the cell, the base station 200 allocates the uplink control channel i to a mobile station moving at a slow speed and the uplink control channel j to a mobile station moving at a high speed. This is because such a mobile station moving at a slow speed may transmit SRS at longer intervals as the quality of communication with the mobile station may not be measured frequently.

Figure 9:
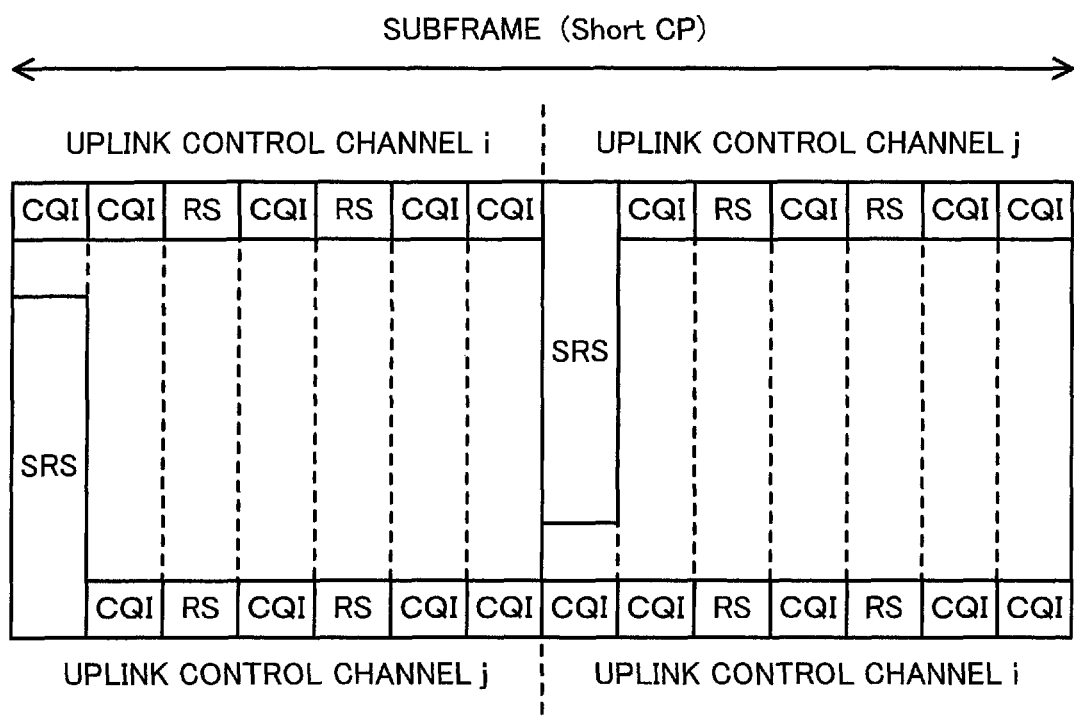
FIG. 9 illustrates an example of uplink signals including CQI according to the first embodiment.

FIG. 9 illustrates an example of uplink signals including CQI according to the first embodiment. FIG. 9 describes how to allocate radio resources in the case where a signal indicating CQI and SRS are multiplexed in a subframe with Short CP.

In each of the first and second half slots of an uplink control channel i, five out of the seven symbols are allocated for CQI while the other two are allocated for RS. More specifically, the symbols are allocated for CQI, CQI, RS, CQI, RS, CQI, and CQI, in order from the first symbol. Note that the CQI signal is divided and transmitted in a plurality of symbols.

Similarly to the uplink control channel i, in each of the first and second half slots of an uplink control channel j, five out of the seven symbols are allocated for CQI while the other two are allocated for RS. However, when one or more mobile stations transmit SRS, the first symbol is used for the SRS transmission, and is not used for the CQI transmission.

As described above for the case of ACK in FIG. 8, the uplink control channel j is allocated to a mobile station which is supposed to transmit SRS, and the uplink control channel i is allocated to a mobile station which is not supposed to transmit SRS. Therefore, even when another mobile station transmits SRS, the mobile station which does not transmit SRS can use all symbols in the subframe for the CQI transmission on the uplink control channel.

Figure 10:
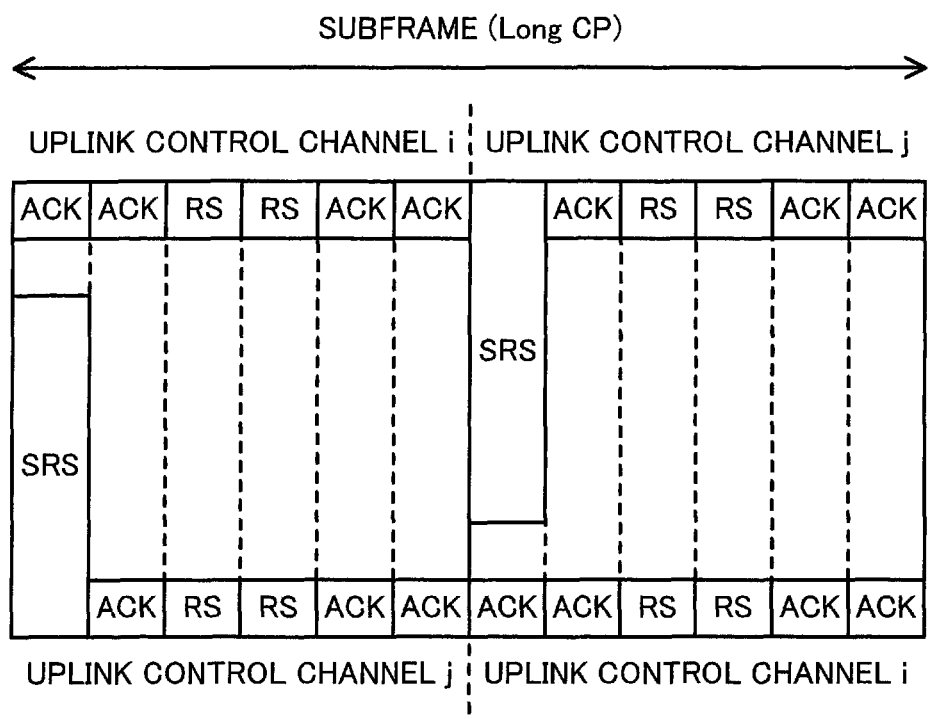
FIG. 10 illustrates another example of uplink signals including ACK according to the first embodiment.

FIG. 10 illustrates another example of uplink signals including ACK according to the first embodiment. FIG. 10 describes how to allocate radio resources in the case where a signal indicating ACK and SRS are multiplexed in a subframe with Long CP. A subframe with Long CP includes twelve symbols. The first half six symbols constitute a slot, and so do the second half six symbols.

In each of the first and second half slots of an uplink control channel i, four out of the six symbols are allocated for ACK while the other two are allocated for RS. More specifically, the symbols are allocated for ACK, ACK, RS, RS, ACK, and ACK, in order from the first symbol. In all of the symbols allocated for ACK, the same signal is transmitted.

Similarly to the uplink control channel i, in each of the first and second half slots of an uplink control channel j, four out of the six symbols are allocated for ACK while the other two are allocated for RS. However, when one or more mobile stations transmit SRS, the first symbol is used for the SRS transmission, and is not used for the ACK transmission.

As described above for the case of Short CP in FIG. 8, the uplink control channel j is allocated to a mobile station which is supposed to transmit SRS, and the uplink control channel i is allocated to a mobile station which is not supposed to transmit SRS. Therefore, even when another mobile station transmits SRS, the mobile station which does not transmit SRS can use all symbols in the subframe for the ACK transmission on the uplink control channel.

Figure 11:
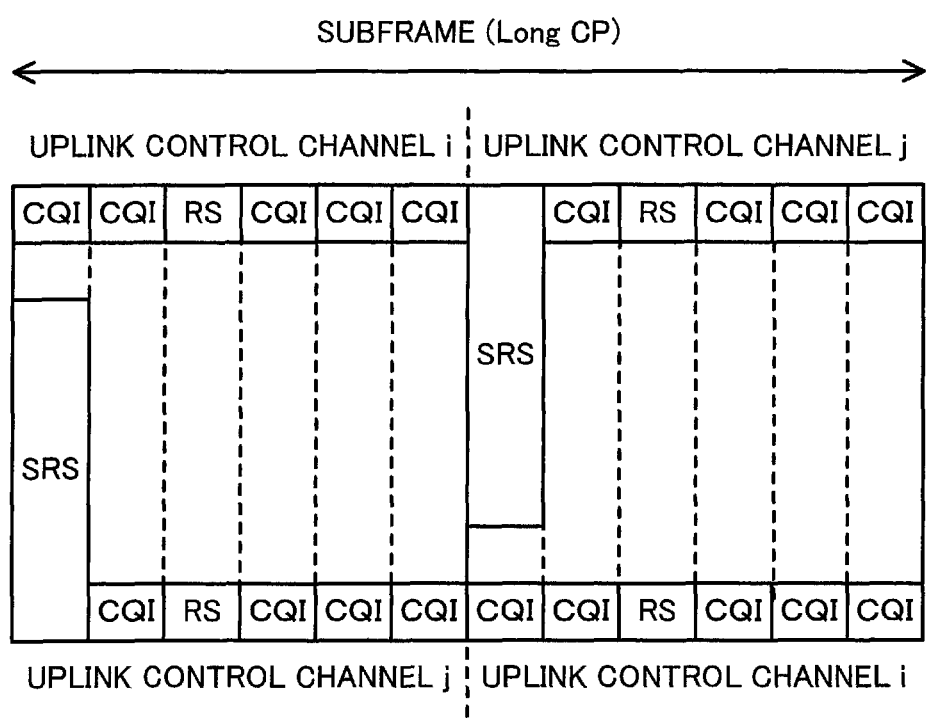
FIG. 11 illustrates another example of uplink signals including CQI according to the first embodiment.

FIG. 11 illustrates another example of uplink signals including CQI according to the first embodiment. FIG. 11 describes how to allocate resources in the case where a signal indicating CQI and SRS are multiplexed in a subframe with Long CP.

In each of the first and second half slots of an uplink control channel i, five out of the six symbols are allocated for CQI while the other one is allocated for RS. More specifically, the symbols are allocated for CQI, CQI, RS, CQI, CQI, and CQI, in order from the first symbol. Note that a CQI signal is divided and transmitted in a plurality of symbols.

Similarly to the uplink control channel i, in each of the first and second half slots of an uplink control channel j, five out of the six symbols are allocated for CQI while the other one is allocated for RS. However, when one or more mobile stations transmit SRS, the first symbol is used for the SRS transmission, and is not used for the CQI transmission.

As described above for the case of Short CP in FIG. 9, the uplink control channel j is allocated to a mobile station which is supposed to transmit SRS, and the uplink control channel i is allocated to a mobile station which is not supposed to transmit SRS. Therefore, even when another mobile station transmits SRS, the mobile station which does not transmit SRS can use all symbols in the subframe for the CQI transmission on the uplink control channel.

FIGS. 8 to 11 describe how ACK or CQI, as an example of an uplink signal, is transmitted. Other types of control information can be transmitted in the same way. In addition, not only one type of control information but also some types of control information can be transmitted in a same subframe. For example, ACK and CQI can be transmitted in a same subframe.

The following describes how to control the radio resource allocation between the mobile stations 100 and 100a and the base station 200. The following examples are the cases of multiplexing SRS and a signal on an uplink data channel and of multiplexing SRS and a signal on an uplink control channel.

Figure 12:
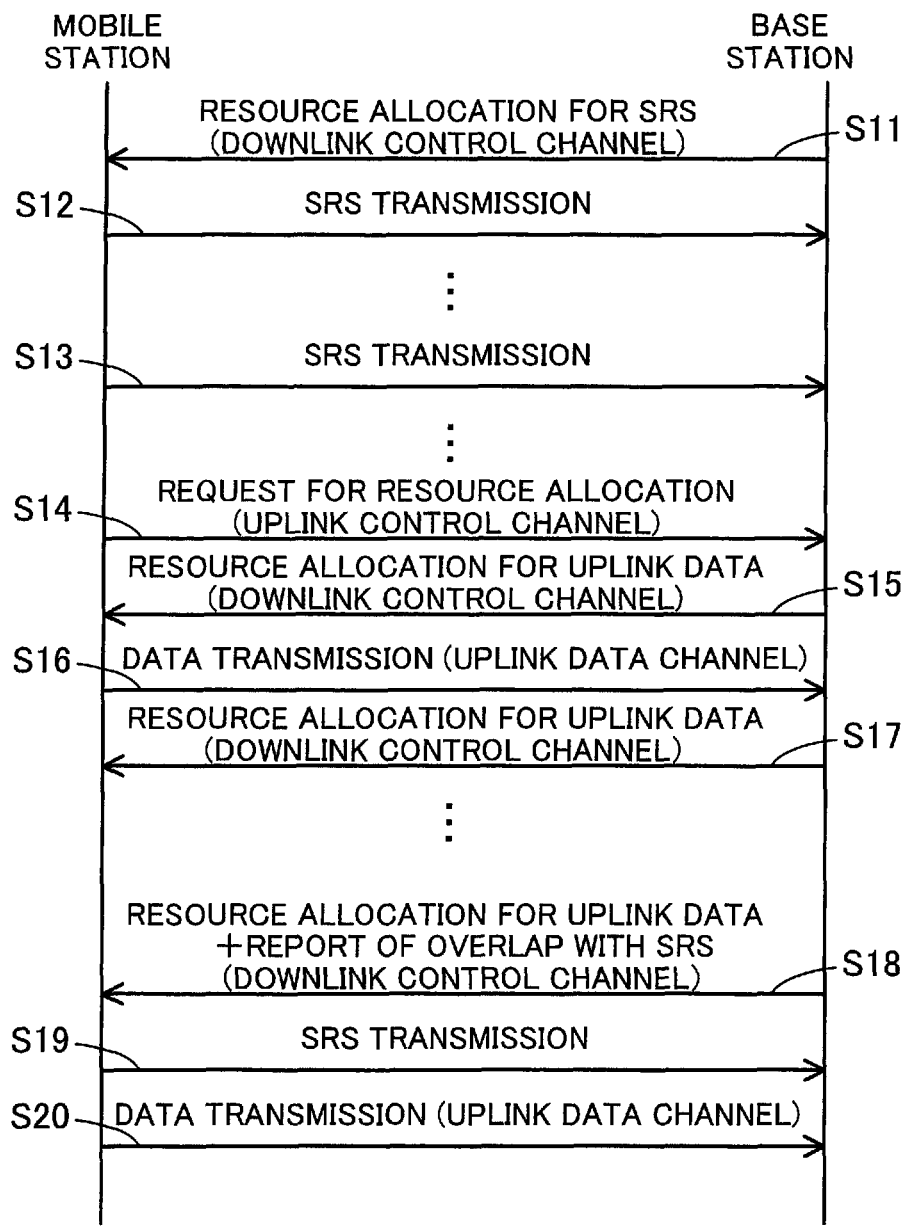
FIG. 12 is a sequence diagram illustrating allocation control in the case where SRS and uplink data overlap.

FIG. 12 is a sequence diagram illustrating allocation control in the case where SRS and uplink data overlap. The sequence in FIG. 12 will be described step by step. This explanation focuses on an uplink from the mobile station 100 to the base station 200.

(Step S11) The base station 200 detects the necessity of measuring the communication quality of an uplink from the mobile station 100 to the base station 200. Then, the base station 200 allocates the mobile, station 100 a radio resource to be used for SRS transmission and sets transmission intervals. Then, the base station 200 transmits the allocation information on a downlink control channel.

(Step S12) The mobile station 100 transmits SRS with the radio resource allocated at step S11. The base station 200 measures the communication quality of the uplink based on the SRS received from the mobile station 100.

(Step S13) After that, the mobile station 100 transmits SRS at the transmission intervals set at step S11, and accordingly the base station 200 measures the communication quality based on the received SRS.

(Step S14) The mobile station 100 detects a request for transmitting packet data to the base station 200. The mobile station 100 then sends a request for radio resource allocation on the uplink control channel.

(Step S15) The base station 200 allocates an uplink data channel to the mobile station 100 in response to the allocation request received at step S14. At this time, the base station 200 selects a frequency band to be used, based on the measurement results obtained at steps S12 and 13. Then, the base station 200 transmits UL allocation grant information on the downlink control channel.

(Step S16) The mobile station 100 transmits the packet data on the uplink data channel allocated at step S15.

(Step S17) The base station 200 newly allocates an uplink data channel to the mobile station 100 after receiving the packet data from the mobile station 100, and then transmits UL allocation grant information on the downlink control channel. After that, the transmission of the packet data from the mobile station 100 and the allocation of an uplink data channel by the base station 200 are repeated until the transmission of the packet data is completed.

(Step S18) The base station 200 detects overlapping transmission of SRS and packet data from the mobile station 100 when allocating an uplink data channel, that is, detects that the SRS and packet data are to be transmitted in a same subframe. Then, the base station 200 sends a report of the overlap with the SRS transmission, together with UL allocation grant information, on the downlink control channel.

(Step S19) The mobile station 100 transmits the SRS with the radio resource allocated at step S11. The base station 200 measures the communication quality of the uplink based on the SRS received from the mobile station 100.

(Step S20) The mobile station 100 transmits the packet data on the uplink data channel allocated at step S18, in symbols other than those used for the SRS transmission.

As described above, the mobile station 100 periodically transmits SRS in response to an instruction from the base station 200, and accordingly the base station 200 measures the communication quality of the uplink based on the received SRS. Then, upon receipt of a request for allocation of an uplink data channel, the base station 200 selects a frequency band to be allocated, based on the measurement results of the communication quality.

When SRS and a signal on an uplink data channel need to be multiplexed, the mobile station 100 transmits the packet data so that the uplink data channel for the packet data transmission does not overlap with the radio resource for the SRS transmission.

Figure 13:
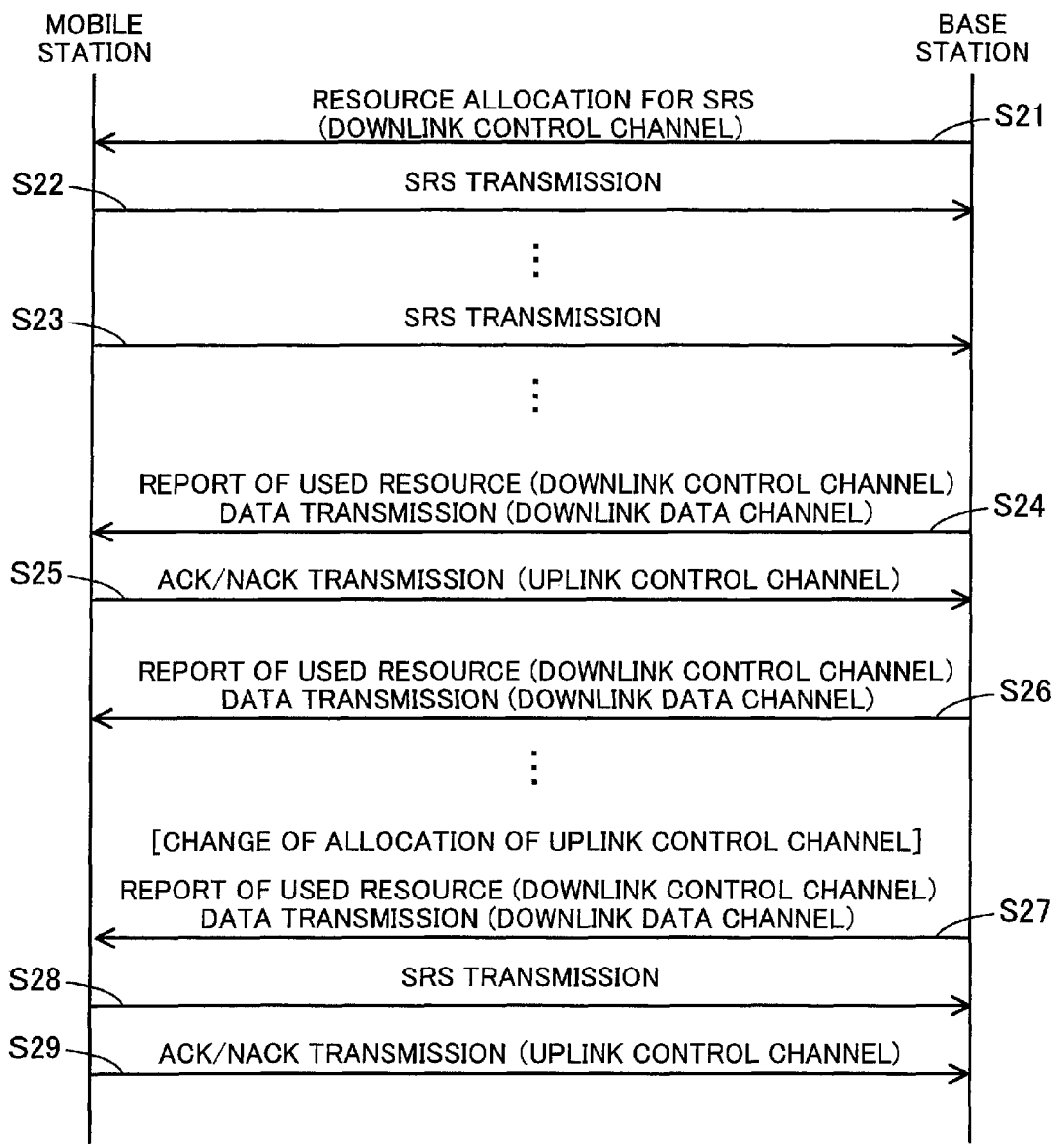
FIG. 13 is a sequence diagram illustrating allocation control in the case where SRS and ACK overlap.

FIG. 13 is a sequence diagram illustrating allocation control in the case where SRS and ACK overlap. The sequence in FIG. 13 will be described step by step. The following explanation focuses on an uplink from the mobile station 100 to the base station 200.

(Step S21) The base station 200 detects the necessity of measuring the communication quality of an uplink from the mobile station 100 to the base station 200. Then the base station 200 allocates the mobile station 100 a radio resource to be used for SRS transmission, sets transmission intervals, and then transmits the allocation information on a downlink control channel.

(Step S22) The mobile station 100 transmits SRS with the radio resource allocated at step S21, and the base station 200 measures the communication quality of the uplink based on the SRS received from the mobile station 100.

(Step S23) After that, the mobile station 100 transmits SRS at transmission intervals set at step S21, and accordingly the base station 200 measures the communication quality based on the received SRS.

(Step S24) The base station 200 obtains packet data addressed to the mobile station 100. Then the base station 200 sends a report of the radio resource used for a downlink data channel, on the downlink control channel, and also transmits the packet data on the downlink data channel.

(Step S25) In response to the packet data received at step S24, the mobile station 100 transmits ACK or NACK on the uplink control channel. More specifically, the mobile station 100 transmits ACK if demodulation and decoding of the packet data is successfully completed. The mobile station 100 transmits NACK, on the contrary, if the demodulation and decoding is not successful.

(Step S26) The base station 200 sends a report of the radio resource used for a downlink data channel, on the downlink control channel, and also transmits packet data on the downlink data channel. The packet data to be transmitted here is packet data to be transmitted after the ACK is received at step S25. If the NACK is received, then the packet data transmitted last time is transmitted again. After that, the transmission of ACK/NACK response from the mobile station 100 and the transmission of the packet data from the base station 200 are repeated until the transmission of the packet data is completed.

(Step S27) When allocating a downlink data channel, the base station 200 detects overlapping transmission of SRS and ACK/NACK from the mobile station 100, that is, detects that the SRS and ACK/NACK are to be transmitted in a same subframe. Then, the base station 200 allocates different uplink control channels to the mobile station 100 and other mobile stations which are not supposed to transmit SRS. The allocation of uplink data channels is changed by changing the allocation of downlink control channels. Then the base station 200 sends a report of the radio resource used for a downlink data channel, on a downlink control channel, and also transmits the packet data on the downlink data channel.

(Step S28) The mobile station 100 transmits SRS with the radio resource allocated at step S21, and the base station 200 measures the communication quality of the uplink based on the SRS received from the mobile station 100.

(Step S29) As a response to the packet data at step S27, the mobile station 100 transmits ACK or NACK on the uplink control channel, in symbols other than those used for the SRS transmission.

As described above, in response to an instruction from the base station 200, the mobile station 100 periodically transmits SRS, and accordingly the base station 200 measures the communication quality of the uplink based on the received SRS. When obtaining packet data addressed to the mobile station 100, the base station 200 transmits the packet data on a downlink data channel. Upon receipt of the packet data, the mobile station 100 transmits an ACK/NACK response.

If SRS and an ACK/NACK signal need to be multiplexed, then the base station 200 allocates different uplink control channels to the mobile station 100 and other mobile stations which are not supposed to transmit SRS. The mobile station 100 transmits the ACK/NACK so that the uplink control channel for the ACK/NACK transmission does not overlap with the radio source for the SRS transmission.

The above explanation describes the case where the same mobile station transmits packet data or control information, and SRS. The same control can be applied to the case where different mobile stations transmit them.

In the above-described communication system, one of two uplink control channels can be used without interference of SRS, even in a subframe including the SRS transmission. Therefore, SRS and a control information signal can be multiplexed so as not to cause deterioration in communication quality. In addition, by using both SRS which is received in the first half slot and the SRS which is received in the second half slot, the base station can measure the quality of a wide range of frequencies.

Second Embodiment

The second embodiment will now be described in detail with reference to the accompanying drawings. This section focuses on differences from the aforementioned first embodiment, and will omit explanation of same features. A communication system according to the second embodiment uses one subframe, not one slot, as an interval of transmission of a pair of two SRSs.

The communication system according to the second embodiment can be realized by the same configuration as that according to the first embodiment. A mobile station and base station according to the second embodiment can be realized by the same module configurations as the mobile station 100 and base station 200 of FIGS. 3 and 4 according to the first embodiment, respectively. However, the second embodiment transmits and receives SRS and measures the communication quality at different times from the first embodiment. The following description of the second embodiment uses the same reference numbers of the mobile station and base station as the first embodiment.

Figure 14:
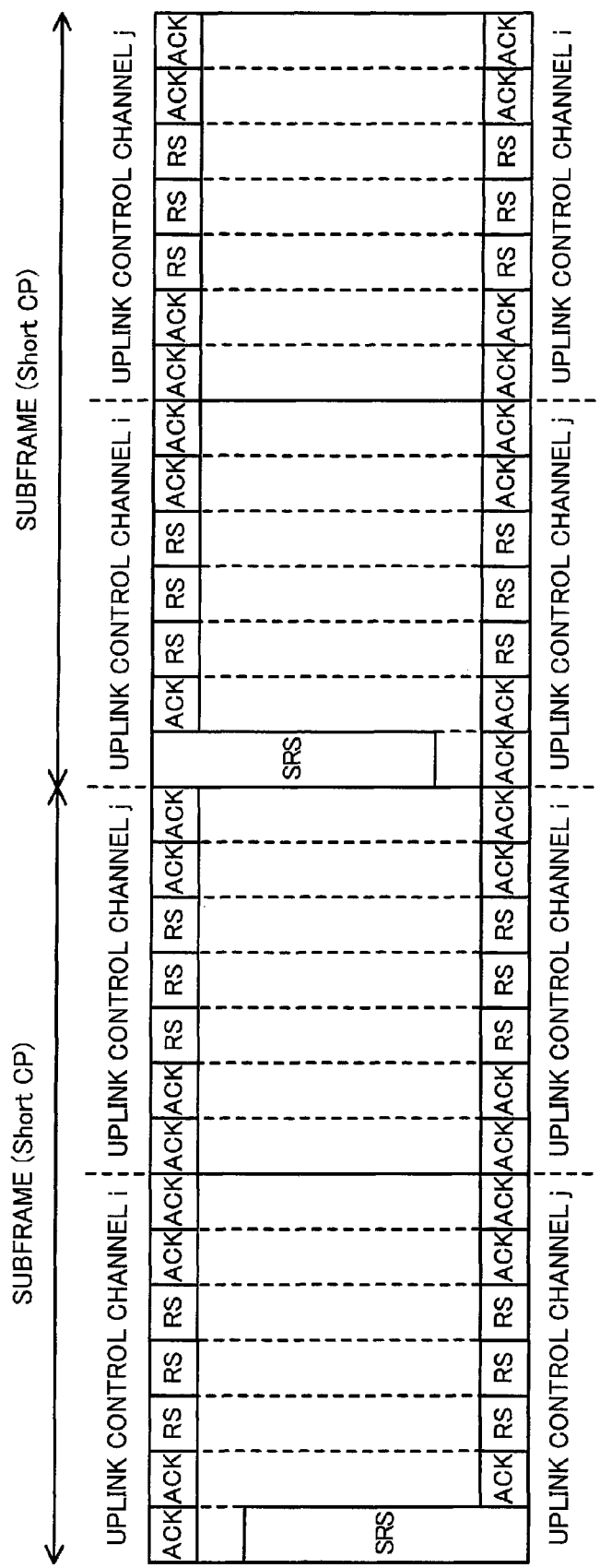
FIG. 14 illustrates an example of uplink signals including ACK according to a second embodiment.

FIG. 14 illustrates an example of uplink signals including ACK according to the second embodiment. FIG. 14 illustrates how to allocate radio resources in the case where a signal indicating ACK and SRS are multiplexed in two consecutive subframes with Short CP.

In each slot of an uplink control channel i, four out of the seven symbols are allocated for ACK while the other three symbols are allocated for RS. More specifically, the symbols are allocated for ACK, ACK, RS, RS, RS, ACK, and ACK, in order from the first symbol. However, when one or more mobile stations transmit SRS, the first symbol of the second subframe is used for the SRS transmission, and is not used for the ACK transmission.

Similarly to the uplink control channel i, in each slot of an uplink control channel j, four out of the seven symbols are allocated for ACK while the other three are allocated for RS. However, when one or more mobile stations transmit SRS, the first symbol of the first subframe is used for the SRS transmission, and is not used for the ACK transmission.

In the first symbol of the first subframe, a wideband radio resource which is allocated for SRS does not include the frequency band of the uplink control channel i but does include that of the uplink control channel j. In the first symbol of the second subframe, a wideband radio resource which is allocated for SRS includes the frequency band of the uplink control channel i but does not include that of the uplink control channel j.

A mobile station which is supposed to transmit SRS is allocated the uplink control channel j of the first subframe and the uplink control channel i of the second subframe. On the other hand, a mobile station which is not supposed to transmit SRS is allocated the uplink control channel i of the first subframe and the uplink control channel j of the second subframe. Therefore, the mobile station which does not transmit SRS but does transmit ACK on an uplink control channel can use all symbols in the subframes even when another mobile station transmits SRS. In addition, the base station 200 can measure communication quality based on the SRSs received in the first symbols of two consecutive subframes.

Figure 15:
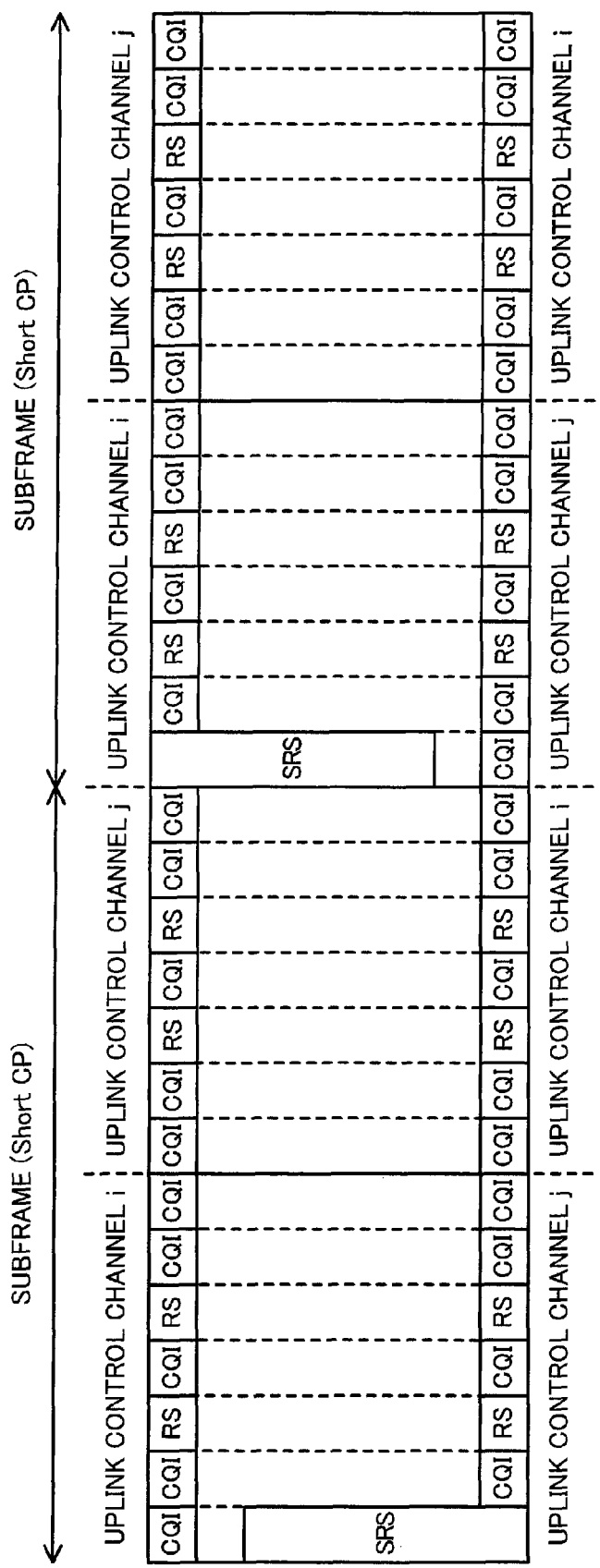
FIG. 15 illustrates an example of uplink signals including CQI according to the second embodiment.

FIG. 15 illustrates an example of uplink signals including CQI according to the second embodiment. FIG. 15 illustrates an example of how to allocate radio resources in the case where a signal indicating CQI and SRS are multiplexed in two consecutive subframes with Short CP.

In each slot of an uplink control channel i, five out of the seven symbols are allocated for CQI while the other two are allocated for RS. More specifically, the symbols are allocated for CQI, CQI, RS, CQI, RS, CQI, and CQI, in order from the first symbol. However, when one or more mobile stations transmit SRS, the first symbol of the second subframe is used for the SRS transmission, and is not used for the CQI transmission.

Similarly to the uplink control channel i, in each slot of an uplink control channel j, five out of the seven symbols are allocated for CQI while the other two are allocated for RS. However, when one or more mobile stations transmit SRS, the first symbol of the first subframe is used for the SRS transmission, and is not used for the CQI transmission.

As described for the example of ACK in FIG. 14, a mobile station which is supposed to transmit SRS is allocated the uplink control channel j of the first subframe and the uplink control channel i of the second subframe. On the other hand, a mobile station which is not supposed to transmit SRS is allocated the uplink control channel i of the first subframe and the uplink control channel j of the second subframe. Therefore, a mobile station which does not transmit SRS but does transmit CQI on an uplink control channel can use all symbols in the subframes even when another mobile station transmits SRS. Then, the base station 200 can measure the communication quality based on the SRSs received in the first symbols of two consecutive subframes.

FIGS. 14 and 15 illustrates how ACK or CQI, as an example of an uplink signal, is transmitted. The same technique can be applied for transmitting other types of control information. In addition, not only one type of control information but also different types of control information can be transmitted in a same subframe. For example, ACK and CQI can be transmitted in a same subframe. In addition, FIGS. 14 and 15 illustrate an example of Short CP. However, Long CP can be used as described in the first embodiment.

Such the communication system can provide the same effects as that of the first embodiment. In addition, the communication system according to the second embodiment can suppress a decrease in the number of signals to be time-multiplexed with SRS on an uplink control channel.

Third Embodiment

The third embodiment will now be described in detail with reference to the accompanying drawings. This section focuses on differences from the aforementioned first embodiment, and will omit explanation of same features. A communication system according to the third embodiment allows a mobile station to perform antenna diversity transmission, that is, to perform radio communication with a plurality of antennas.

The communication system according to the third embodiment can be realized by the same system configuration as that according to the first embodiment of FIG. 2, except that a mobile station and base station of the third embodiment perform antenna diversity. The mobile station and base station of the third embodiment are given reference numbers 100b and 200a, respectively.

Figure 16:
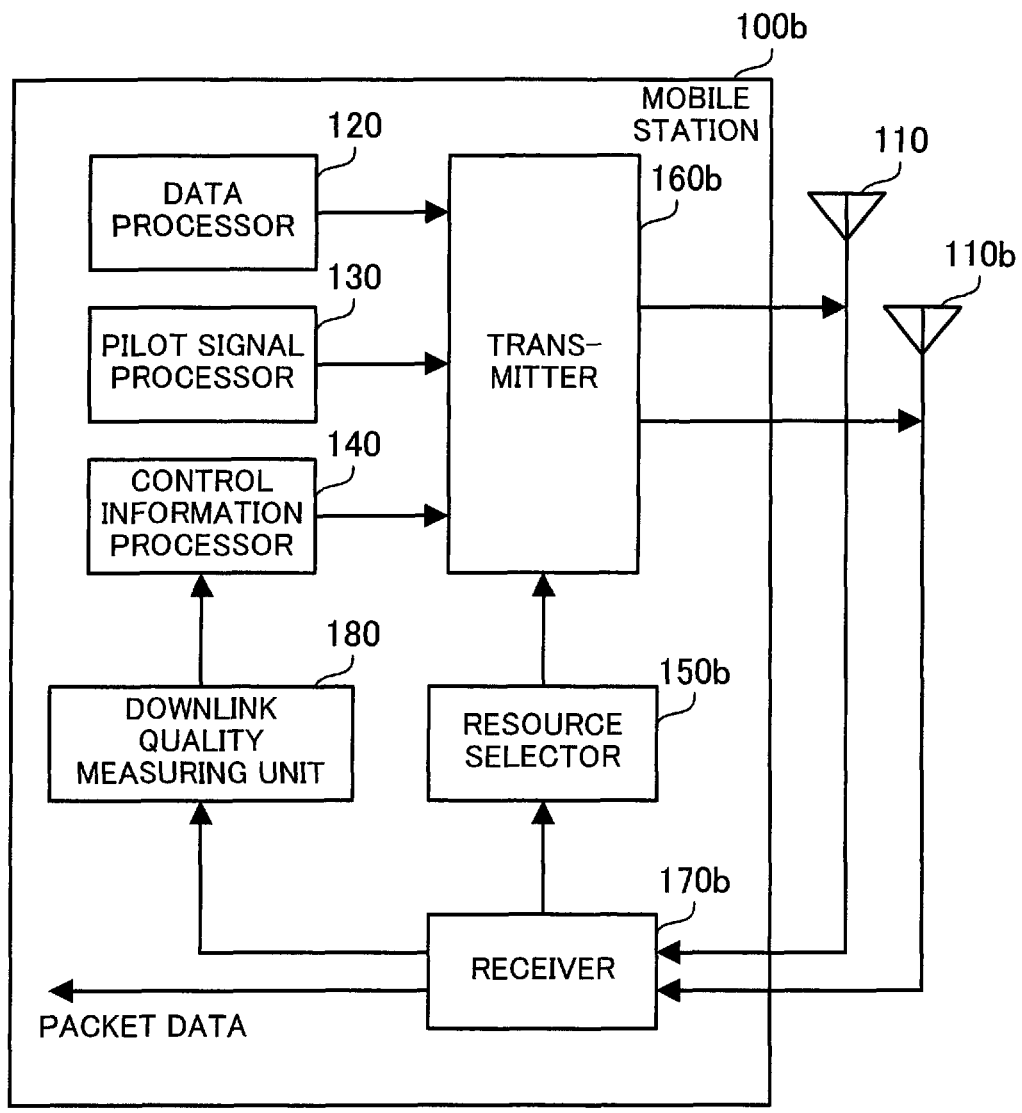
FIG. 16 is a block diagram illustrating functions of a mobile station according to a third embodiment.

FIG. 16 is a block diagram illustrating functions of a mobile station according to the third embodiment. The mobile station 100b includes transmitting and receiving antennas 110 and 110b, a data processor 120, a pilot signal processor 130, a control information processor 140, a resource selector 150b, a transmitter 160b, a receiver 170b, and a downlink quality measuring unit 180. The data processor 120, pilot signal processor 130, control information processor 140, and downlink quality measuring unit 180 have the same functions of the corresponding components in the first embodiment of FIG. 3.

The transmitting and receiving antennas 110 and 110b are antennas for transmission and reception. Each transmitting and receiving antenna 110, 110b transmits uplink signals output from the transmitter 160b by radio to the base station 200a. In addition, the transmitting and receiving antenna 110, 110b receives downlink signals transmitted by radio from the base station 200a, and passes the signals to the receiver 170b. At the time of transmission, the transmitter 160b selects one of the transmitting and receiving antennas 110 and 110b.

The resource selector 150b manages uplink radio resources which are available to the mobile station 100b. In addition, the resource selector 150b manages switching between the transmitting and receiving antennas 110 and 110b for use in radio transmission. The resource selector 150b provides the transmitter 160b with information on the current state of allocation of radio resources and a choice of which antenna to use.

The transmitter 160b identifies radio resources to be used for transmission of pilot data, pilot signal, and control information, based on the information provided by the resource selector 150b. The transmitter 160b also selects a transmitting and receiving antenna to be used for each transmission, based on the information provided by the resource selector 150b. Then the transmitter 160b modulates and multiplexes signals, and outputs the resultant to the selected transmitting and receiving antenna.

When receiving signals via the transmitting and receiving antennas 110 and 110b, the receiver 170b selects either signal with a high reception quality, and then demodulates and decodes a signal addressed to the own station out of the selected received signal. Packet data included in the received signal, if there is, is taken inside.

The receiver 170b passes the resource selector 150b UL allocation grant information included in the received signal, if there is. If control information to instruct antenna switching is included in the received signal, then the receiver 170b passes the information to the resource selector 150b. In addition, the receiver 170b supplies the downlink quality measuring unit 180 with a signal to be used for measuring the communication quality of the downlink out of the received signal.

A control method for the antenna switching of the resource selector 150b includes open-loop control and closed-loop control. In the open-loop control, the resource selector 150b switches between the transmitting and receiving antennas 110 and 110b as scheduled. For example, the resource selector 150b periodically switches between the transmitting and receiving antennas 110 and 110b.

In the closed-loop control, on the other hand, the resource selector 150b switches between the transmitting and receiving antennas 110 and 110b in response to an instruction from the base station 200a. The base station 200a instructs which antenna to use, based on, for example, the communication qualities of signals received from the respective transmitting and receiving antennas 110 and 110b.

The control method to be adopted is previously set in the resource selector 150b. This embodiment employs the closed-loop control.

The base station 200a according to the third embodiment can be realized by the same module configuration as the base station 200 of the first embodiment of FIG. 4, except that communication quality is measured by each of the transmitting and receiving antennas 110 and 110b provided in the mobile station 100b.

Figure 17:
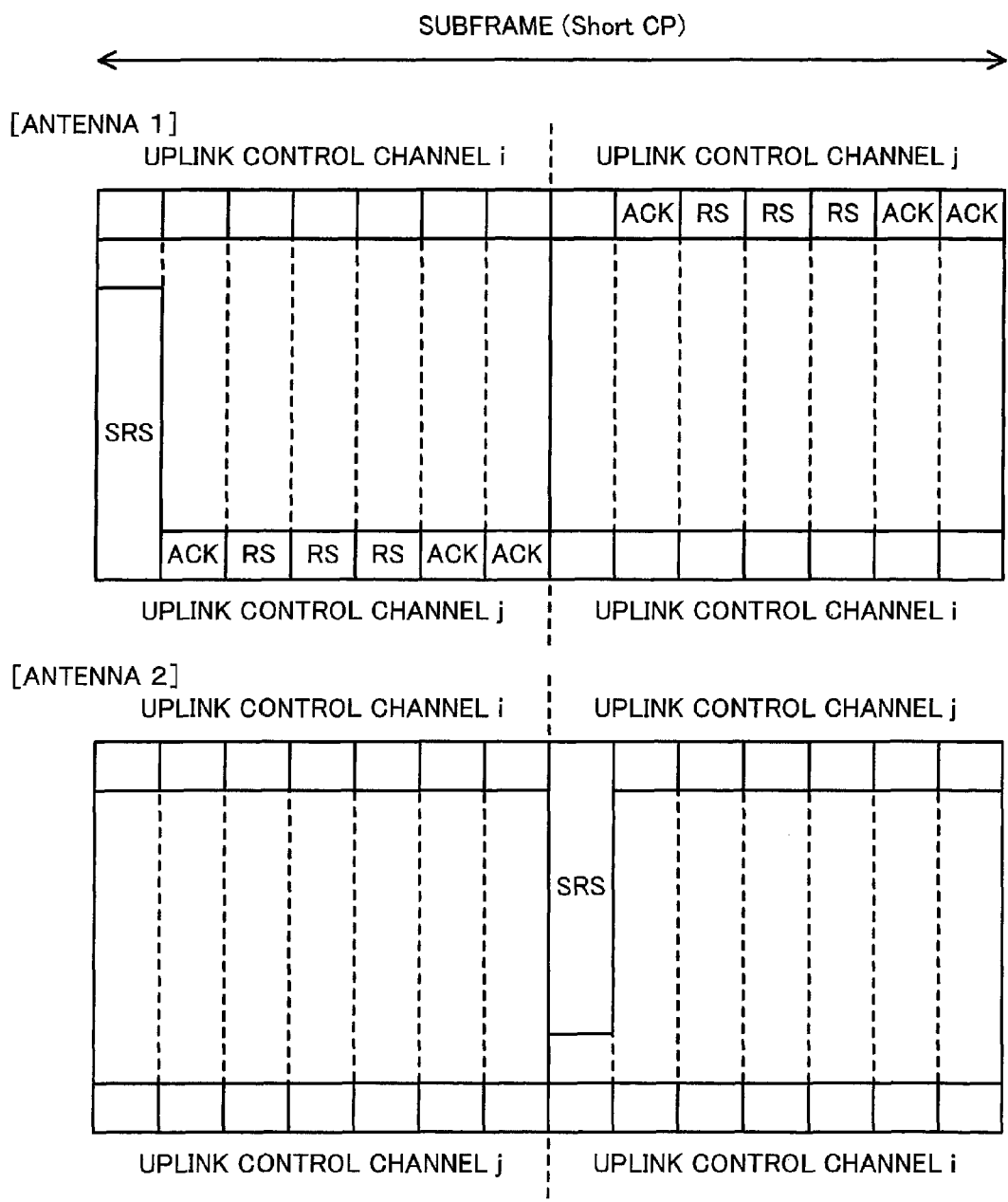
FIG. 17 illustrates an example of uplink signals including ACK according to the third embodiment.

FIG. 17 illustrates an example of uplink signals including ACK according to the third embodiment. FIG. 17 illustrates how to allocate radio resources in the case where a signal indicating ACK and SRS are multiplexed in a subframe with Short CP. Upper signals are signals that are transmitted from the transmitting and receiving antenna 110 to the base station 200a while lower signals are signals that are transmitted from the transmitting and receiving antenna 110b to the base station 200*a*. Note that FIG. 17 does not illustrate any signals which are transmitted from other mobile stations.

As in the aforementioned first embodiment, the mobile station 100*b* which is supposed to transmit SRS is allocated an uplink control channel j. It is now assumed that the mobile station 100*b* selects the transmitting and receiving antenna 110 for radio transmission. Then, the mobile station 110*b* transmits ACK and RS signals on the uplink control channel j from the transmitting and receiving antenna 110. The mobile station 110*b* also transmits SRS at the beginning of each slot.

In this connection, one of two SRSs is transmitted from the transmitting and receiving antenna 110 and the other is transmitted from the transmitting and receiving antenna 110*b*. That is, the mobile station 100*b* is designed to transmit the SRS from the transmitting and receiving antenna 110*b* even while transmitting ACK from the transmitting and receiving antenna 110. This enables the base station 200*a* to measure the communication qualities of both the transmitting and receiving antennas 100 and 100*b*.

Figure 18:
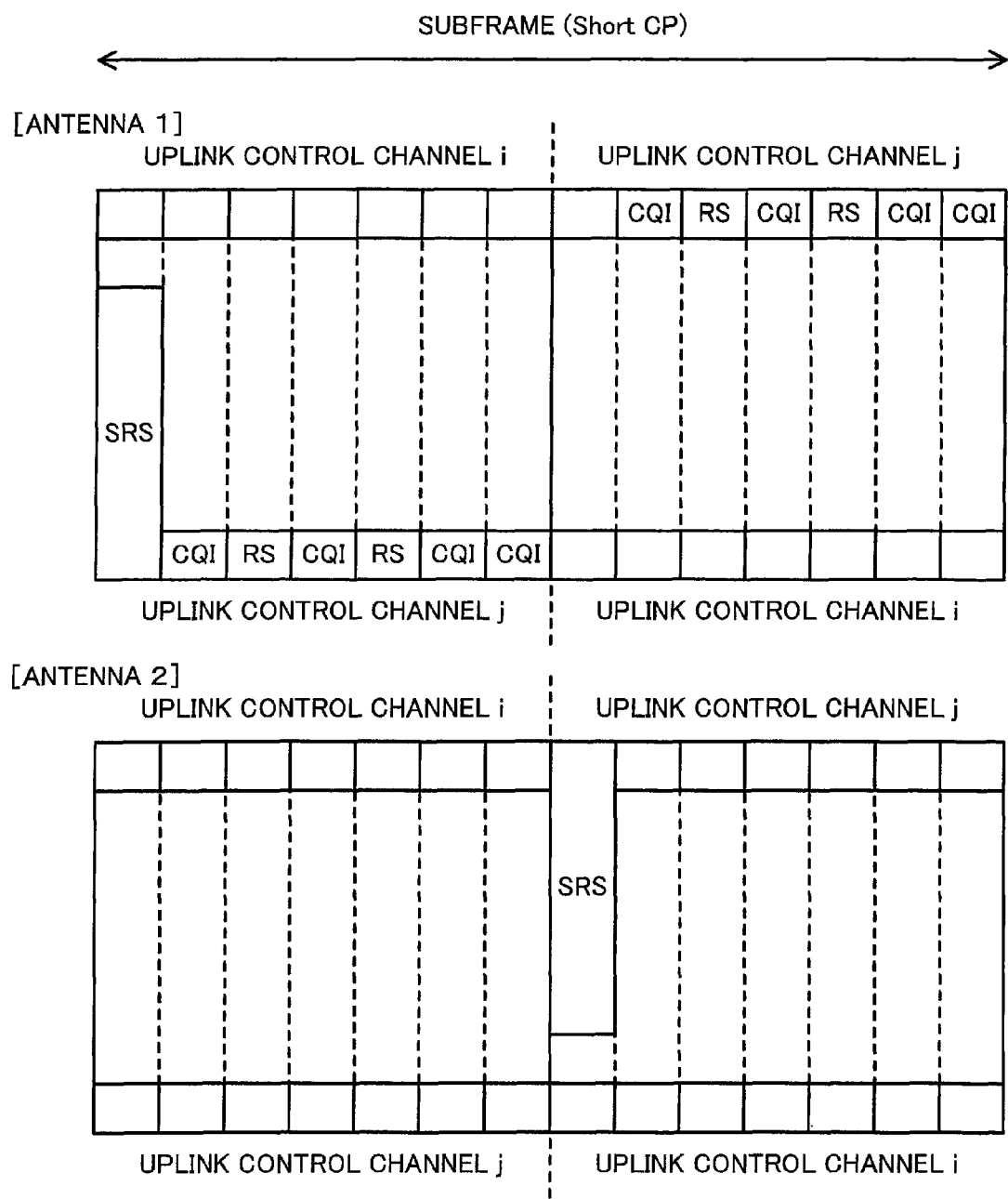
FIG. 18 illustrates an example of uplink signals including CQI according to the third embodiment.

FIG. 18 illustrates an example of uplink signals including CQI according to the third embodiment. FIG. 18 illustrates how to allocate radio resources in the case where a signal indicating CQI and SRS are multiplexed in a subframe with Short CP.

The mobile station 100*b* transmits CQI and RS signals on an uplink control channel j from the transmitting and receiving antenna 110. The mobile station 100*b* also transmits SRS at the beginning of each slot. In this connection, one of two SRSs is transmitted from the transmitting and receiving antenna 110 while the other is transmitted from the transmitting and receiving antenna 110*b*. That is, the mobile station 100*b* is designed to transmit the SRS from the transmitting and receiving antenna 110*b* even while transmitting CQI from the transmitting and receiving antenna 110. This allows the base station 200*a* to measure the communication qualities of both the transmitting and receiving antennas 110 and 110*b*.

By the way, only for the mobile station 100*b* to select an antenna to be used, there is no need to measure the communication quality of a wide range of frequencies. Further, if the mobile station 100*b* has no packet data to transmit on the uplink within a predetermined period of time, the base station 200*a* has no need to measure the communication quality of frequencies which may be used for an uplink data channel. Therefore, as long as there is no packet data to be transmitted on the uplink, the mobile station 100*b* omits the SRS transmission at frequencies other than the frequency band of the uplink control channel.

Figure 19:
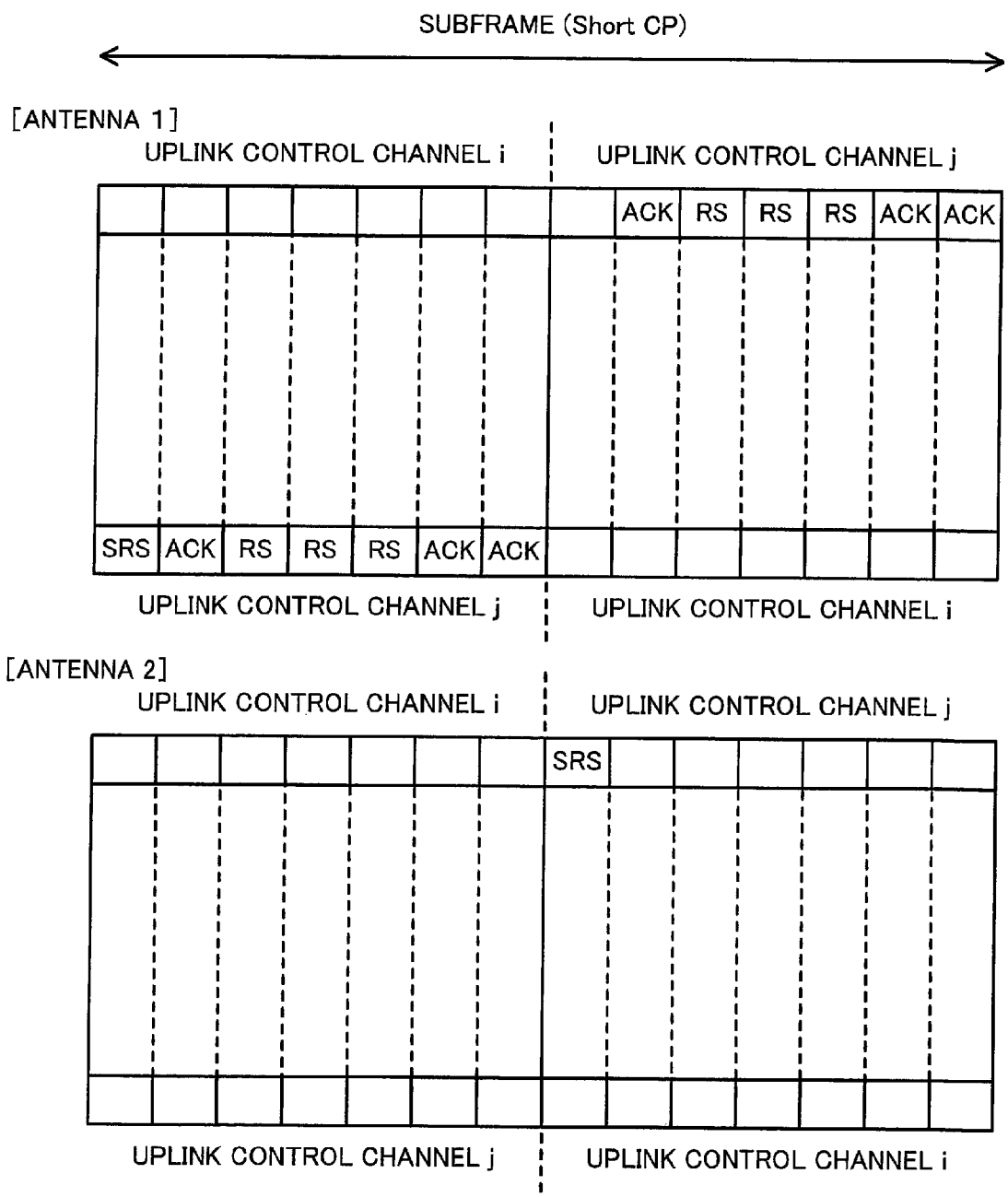
FIG. 19 illustrates another example of uplink signals including ACK according to the third embodiment.

FIG. 19 illustrates another example of uplink signals including ACK according to the third embodiment. FIG. 19 illustrates how to allocate radio resources in the case where a signal indicating ACK and SRS are multiplexed in a subframe with Short CP and the mobile station 100*b* has no packet data to transmit.

The mobile station 100*b* transmits ACK and RS signals on the uplink control channel j from the transmitting and receiving antenna 110. The mobile station 100*b* also transmits SRS with only the frequency band of the uplink control channel j at the beginning of each slot. In this connection, the SRS transmission is made from the transmitting and receiving antenna 110 in one of the two slots and from the transmitting and receiving antenna 110*b* in the other slot.

This prevents the base station 200*a* from obtaining information to be used for selecting a frequency band to be allocated for an uplink data channel, but enables the base station 200*a* to obtain information to be used by the mobile station 100*b* to select an antenna to be used. In order to omit the SRS transmission using the frequencies other than the frequency band of the uplink control channel, the mobile station 100*b* gives the base station 200*a* an advance notice that the mobile station 100*b* has no packet data to transmit.

Figure 20:
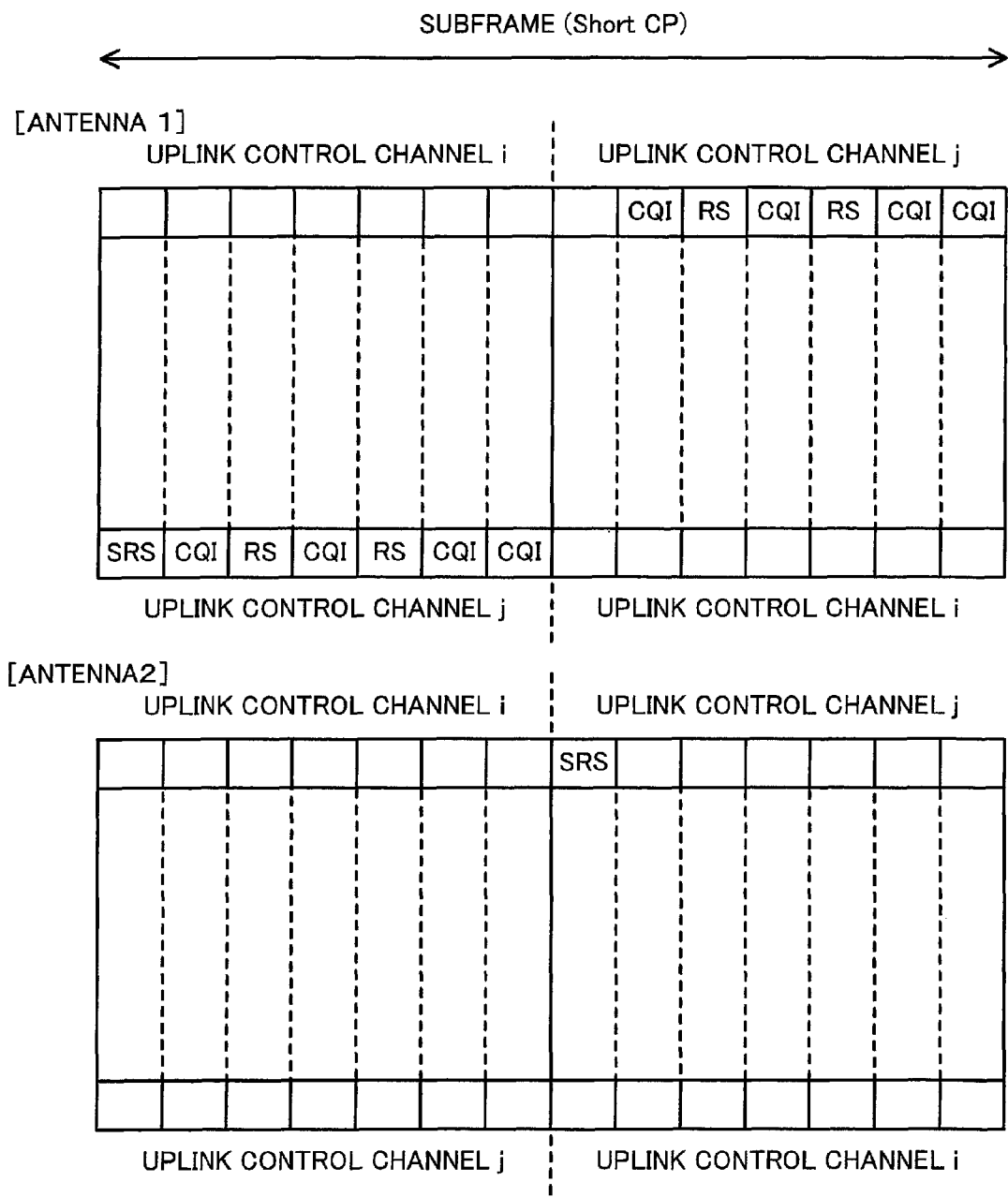
FIG. 20 illustrates another example of uplink signals including CQI according to the third embodiment.
Figure 21:
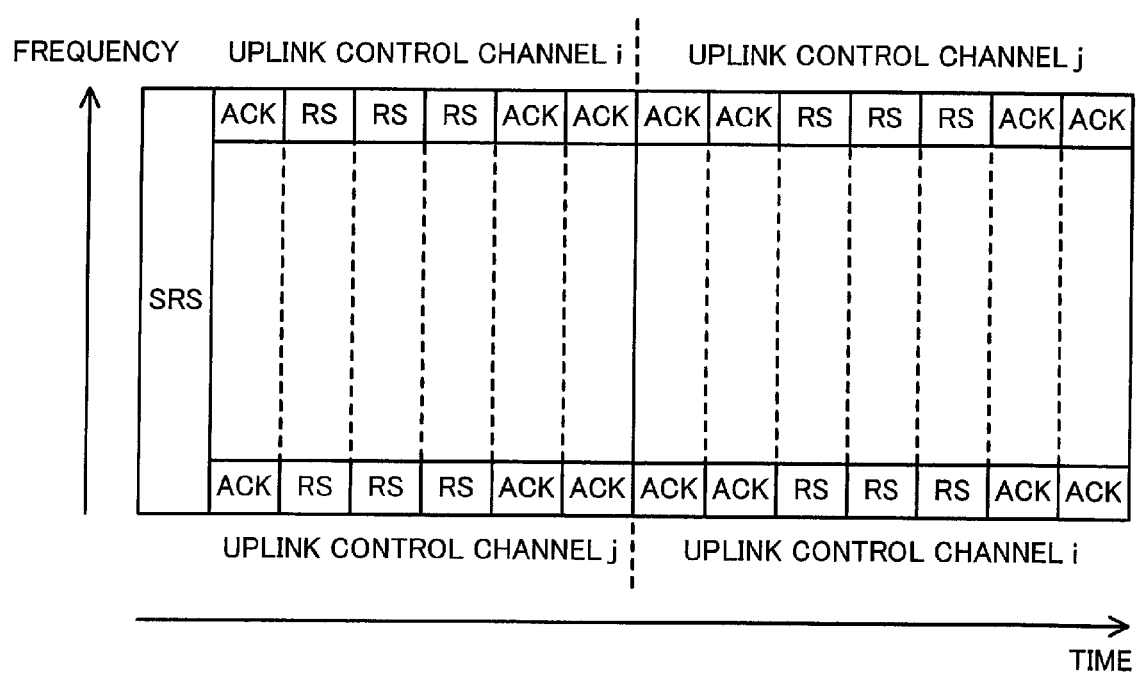
FIG. 21 illustrates an example of uplink signals including SRS.

FIG. 20 illustrates another example of uplink signals including CQI according to the third embodiment. FIG. 20 illustrates how to allocate radio resources in the case where a signal indicating CQI and SRS are multiplexed in a subframe with Short CP and the mobile station 100*b* has no packet data to transmit.

The mobile station 100*b* transmits CQI and RS signals on the uplink control channel j from the transmitting and receiving antenna 110. The mobile station 100*b* also transmits SRS with only the frequency band of the uplink control channel j at the beginning of each slot. In this connection, the SRS transmission is made from the transmitting and receiving antenna 110 in one of the two slots and from the transmitting and receiving antenna 110*b* in the other slot.

This prevents the base station 200*a* from obtaining information to be used for selecting a frequency band to be allocated for an uplink data channel, but enables the base station 200*a* to obtain information to be used by the mobile station 100*b* to select an antenna to be used.

FIGS. 17 to 20 illustrate how ACK or CQI, as an example of an uplink signal, is transmitted, and other types of control information can be transmitted in the same way. In addition, not only one type of control information but also some types of control information can be transmitted in a same subframe. For example, ACK and CQI can be transmitted in a same subframe. In addition, though FIGS. 17 to 20 illustrate the example of Short CP, Long CP may be used as described in the first embodiment. Further, SRS may be transmitted in the first symbols of two consecutive subframes as described in the second embodiment.

Such the communication system can provide the same effects as that of the first embodiment. Further, with the communication system according to the third embodiment, the results of measuring communication quality based on SRSs can be used for selecting an antenna in antenna diversity. Still further, when a mobile station has no packet data to transmit, a frequency band can be reduced for SRS transmission, thereby reducing the loads of measuring communication quality on the base station.

Although this embodiment uses the first symbol of each slot for SRS transmission, a predetermined symbol other than the first one can be used for the SRS transmission. Further, although this embodiment transmits a pair of SRSs in two consecutive slots or subframes, the SRSs can be transmitted in separate slots or subframes. Still further, this embodiment uses the two limiting frequencies of a frequency band available between the mobile station and base station for two uplink control channels, a predetermined frequency band other than the limiting frequencies can be used.

According to the present invention, a signal to be used for measuring communication quality is transmitted in a first time period in a frequency band which does not include a first frequency, and then is transmitted in a second time period in a frequency band which does not include a second frequency. Therefore, there exists a frequency band without interference of the signal in each of the first and second time periods. This can prevent quality deterioration in data transmission and reception. In addition, using the signal transmitted in the first time period and transmitted in the second time period enables measurement of quality of a wide range of frequencies.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A transmitting apparatus which is capable of performing transmission at both a first frequency and a second frequency, the transmitting apparatus comprising:
   a generator which generates a signal to be used by a receiving apparatus for measuring communication quality; and
   a transmitter which transmits the signal in a first frequency band in a given portion of a first time period, and transmits the signal in a second frequency band in a given portion of a second time period coming after the first time period, the first frequency band not including the first frequency, the second frequency band not including the second frequency, wherein:
   each of the first time period and the second time period includes a first sub-time period including the given portion used for transmission of the signal and a second sub-time period not including the given portion for transmission of the signal; and
   when performing both the signal transmission and data transmission in the first time period, the transmitter performs the data transmission at the second frequency in the first sub-time period of the first time period except for the given portion used for the signal transmission, and performs the data transmission at the first frequency in the second sub-time period of the first time period, and when performing both the signal transmission and the data transmission in the second time period, the transmitter performs the data transmission at the first frequency in the first sub-time period of the second time period except for the given portion used for the signal transmission, and performs the data transmission at the second frequency in the second sub-time period of the second time period.

2. The transmitting apparatus according to claim 1, wherein, when performing both transmission of the signal and data transmission in the first time period and the second time period, the transmitter performs the data transmission at the second frequency in the first time period except for the given portion used for the signal transmission, and performs the data transmission at the first frequency in the second time period except for the given portion used for the signal transmission.

3. The transmitting apparatus according to claim 1, further comprising a plurality of antennas,
   wherein the transmitter uses different antennas for transmissions of the signal in the first time period and in the second time period.

4. The transmitting apparatus according to claim 3, wherein, the transmitter omits to transmit the signal in a frequency band other than the frequency band used for data transmission when there is no transmission other than the data transmission at the first frequency and the data transmission at the second frequency.

5. The transmitting apparatus according to claim 1, wherein the transmitter transmits the signal at a beginning of the first time period and at a beginning of the second time period.

6. The transmitting apparatus according to claim 1, wherein one of a maximum frequency and a minimum frequency of a frequency band available between the transmitting apparatus and the receiving apparatus is the first frequency, and another frequency is the second frequency.

7. The transmitting apparatus according to claim 1, wherein each of the first frequency band and the second frequency band is wider than a frequency band used for data transmission.

8. A receiving apparatus for performing communication with a transmitting apparatus which is capable of performing transmission at both a first frequency and a second frequency, the receiving apparatus comprising:
   a receiver which receives a signal which is transmitted from the transmitting apparatus in a first frequency band in a given portion of a first time period and the signal which is transmitted from the transmitting apparatus in a second frequency band in a given portion of a second time period coming after the first time period, the first frequency band not including the first frequency, the second frequency band not including the second frequency; and
   a quality measuring unit which measures quality of communication with the transmitting apparatus based on the signal transmitted in the first frequency band in the given portion of the first time period and the signal transmitted in the second frequency band in the given portion of the second time period, wherein:
   each of the first time period and the second time period includes a first sub-time period including the given portion used for transmission of the signal and a second sub-time period not including the given portion; and
   the receiving apparatus further comprises a radio resource manager which allocates the first frequency in the first sub-time period and the second frequency in the second sub-time period of the first time period for data transmission of another transmitting apparatus which is not supposed to transmit the signal in the first time period, and allocates the second frequency in the first sub-time period and the first frequency in the second sub-time period of the second time period for the data transmission of another transmitting apparatus which is not supposed to transmit the signal in the second time period.

9. The receiving apparatus according to claim 8, wherein the radio resource manager allocates the first frequency in the first time period and the second frequency in the second time period to another transmitting apparatus which is not supposed to transmit the signal in the first time period and the second time period.

10. The receiving apparatus according to claim 8, wherein when the signal is transmitted via different antennas in the first time period and the second time period, the quality measuring unit measures the quality of communication for each of the different antennas.

11. The receiving apparatus according to claim 10, wherein the quality measuring unit measures the quality of communication based on the signal of only a frequency band used for data transmission while the transmitting apparatus does not perform any transmission other than the data transmission at the first frequency and the data transmission at the second frequency.

12. The receiving apparatus according to claim 8, wherein the quality measuring unit measures the quality of communication based on the signal transmitted at a beginning of the first time period and at a beginning of the second time period.

13. The receiving apparatus according to claim 8, wherein one of a maximum frequency and a minimum frequency of a frequency band available between the transmitting apparatus and the receiving apparatus is the first frequency, and another frequency is the second frequency.

14. A communication method of a transmitting apparatus capable of performing transmission at both a first frequency and a second frequency, the communication method comprising:
  transmitting a signal to be used by a receiving apparatus for measuring communication quality, in a first frequency band in a given portion of a first time period, and transmitting the signal in a second frequency band in a given portion of a second time period coming after the first time period, the first frequency band not including the first frequency, the second frequency band not including the second frequency, wherein:
  each of the first time period and the second time period includes a first sub-time period including the given portion used for transmission of the signal and a second sub-time period not including the given portion for transmission of the signal; and
  the communication method further comprises, when performing both the signal transmission and data transmission in the first time period, performing the data transmission at the second frequency in the first sub-time period of the first time period except for the given portion used for the signal transmission, and performing the data transmission at the first frequency in the second sub-time period of the first time period, and when performing both the signal transmission and the data transmission in the second time period, performing the data transmission at the first frequency in the first sub-time period of the second time period except for the given portion used for the signal transmission, and performing the data transmission at the second frequency in the second sub-time period of the second time period.

15. A communication method of a receiving apparatus for performing communication with a transmitting apparatus which is capable of performing transmission at both a first frequency and a second frequency, the communication method comprising:
  measuring quality of communication with the transmitting apparatus based on a signal which is transmitted from the transmitting apparatus in a first frequency band in a given portion of a first time period and the signal which is transmitted from the transmitting apparatus in a second frequency band in a given portion of a second time period coming after the first time period, the first frequency band not including the first frequency, the second frequency band not including the second frequency, wherein:
  each of the first time period and the second time period includes a first sub-time period including the given portion used for transmission of the signal and a second sub-time period not including the given portion; and
  the communication method further comprises allocating the first frequency in the first sub-time period and the second frequency in the second sub-time period of the first time period for data transmission of another transmitting apparatus which is not supposed to transmit the signal in the first time period, and allocating the second frequency in the first sub-time period and the first frequency in the second sub-time period of the second time period for the data transmission of another transmitting apparatus which is not supposed to transmit the signal in the second time period.

16. A radio communication system comprising a transmitting apparatus which is capable of performing transmission at both a first frequency and a second frequency, and a receiving apparatus which performs communication with the transmitting apparatus, wherein:
  the transmitting apparatus includes a transmitter which transmits a signal to be used by the receiving apparatus for measuring communication quality, in a first frequency band in a given portion of a first time period, and transmits the signal in a second frequency band in a given portion of a second time period coming after the first time period, the first frequency band not including the first frequency, the second frequency band not including the second frequency;
  the receiving apparatus includes a receiver which receives the signal which is transmitted from the transmitting apparatus in the first frequency band in the given portion of the first time period and the signal which is transmitted from the transmitting apparatus in the second frequency band in the given portion of the second time period;
  each of the first time period and the second time period includes a first sub-time period including the given portion used for transmission of the signal and a second sub-time period not including the given portion for transmission of the signal; and
  when performing both the signal transmission and data transmission in the first time period, the transmitter performs the data transmission at the second frequency in the first sub-time period of the first time period except for the given portion used for the signal transmission, and performs the data transmission at the first frequency in the second sub-time period of the first time period, and when performing both the signal transmission and the data transmission in the second time period, the transmitter performs the data transmission at the first frequency in the first sub-time period of the second time period except for the given portion used for the signal transmission, and performs the data transmission at the second frequency in the second sub-time period of the second time period.

17. A radio communication method in a radio communication system for performing communication between a transmitting apparatus and a receiving apparatus for transmission at both a first frequency and a second frequency, the radio communication method comprising:
  transmitting from transmitting apparatus a signal to be used by the receiving apparatus for measuring communication quality, in a first frequency band in a given portion of a first time period, the first frequency band not including the first frequency;
  transmitting from the transmitting apparatus the signal in a second frequency band in a given portion of a second time period coming after the first time period, the second frequency band not including the second frequency;
  receiving by the receiving apparatus the signal which is transmitted from the transmitting apparatus in the first frequency band in the given portion of the first time period; and
  receiving by the receiving apparatus the signal which is transmitted from the transmitting apparatus in the second frequency band in the given portion of the second time period, wherein:
  each of the first time period and the second time period includes a first sub-time period including the given portion used for transmission of the signal and a second sub-time period not including the given portion for transmission of the signal; and the radio communication method further comprises, when performing both the signal transmission and data transmission in the first time period, performing the data transmission at the second frequency in the first sub-time period of the first time period except for the given portion used for the signal transmission, and performing the data transmission at the first frequency in the second sub-time period of the first time period, and when performing both the signal transmission and the data transmission in the second time period, performing the data transmission at the first frequency in the first sub-time period of the second time period except for the given portion used for the signal transmission, and performing the data transmission at the second frequency in the second sub-time period of the second time period.

18. A transmitting apparatus which is capable of performing both data transmission at a first frequency and the data transmission at a second frequency, the transmitting apparatus comprising:
a generator which generates a signal to be used by a receiving apparatus for measuring communication quality; and
a transmitter which transmits the signal in a first frequency band in a given portion of a first time period, and transmits the signal in a second frequency band in a given portion of a second time period coming after the first time period, the first frequency band having a wider bandwidth than a frequency band used for the data transmission, not including the first frequency and including the second frequency, the second frequency band having a wider bandwidth than the frequency band used for the data transmission, not including the second frequency and including the first frequency.

19. A receiving apparatus for performing communication with a transmitting apparatus which is capable of performing both data transmission at a first frequency and the data transmission at a second frequency, the receiving apparatus comprising:
a receiver which receives a signal which is transmitted from the transmitting apparatus in a first frequency band in a given portion of a first time period and the signal which is transmitted from the transmitting apparatus in a second frequency band in a given portion of a second time period coming after the first time period, the first frequency band having a wider bandwidth than a frequency band used for the data transmission, not including the first frequency and including the second frequency, the second frequency band having a wider bandwidth than the frequency band used for the data transmission, not including the second frequency and including the first frequency band; and
a quality measuring unit which measures quality of communication with the transmitting apparatus based on the signal transmitted in the first frequency band in the given portion of the first time period and the signal transmitted in the second frequency band in the given portion of the second time period.

* * * * *